(12) United States Patent
Ahlemeyer et al.

(10) Patent No.: US 10,058,911 B2
(45) Date of Patent: Aug. 28, 2018

(54) DIE CHANGER WITH REMOVABLE DIE ADAPTED THERETO AND DIE DOME AS WELL AS METHOD FOR REMOVING AND INSERTING THE REMOVABLE DIE

(71) Applicant: BÖLLHOFF VERBINDUNGSTECHNIK GMBH, Bielefeld (DE)

(72) Inventors: Fabian Ahlemeyer, Bielefeld (DE); Peter Peters, Schloß Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 351 days.

(21) Appl. No.: 15/151,825

(22) Filed: May 11, 2016

(65) Prior Publication Data

US 2016/0332217 A1 Nov. 17, 2016

(30) Foreign Application Priority Data

May 11, 2015 (DE) .......................... 10 2015 107 337

(51) Int. Cl.
*B23Q 3/155* (2006.01)
*B21J 15/36* (2006.01)
(Continued)

(52) U.S. Cl.
CPC .............. *B21J 15/38* (2013.01); *B21J 15/025* (2013.01); *B21J 15/10* (2013.01); *B21J 15/30* (2013.01);
(Continued)

(58) Field of Classification Search
CPC ......... Y10T 483/1729; Y10T 483/1731; Y10T 29/49833–29/49837; Y10T 29/49943;
(Continued)

(56) References Cited

U.S. PATENT DOCUMENTS 5,346,454 A * 9/1994 Hayashi ................. B21D 28/12
483/29
5,361,473 A 11/1994 Landes
(Continued)

FOREIGN PATENT DOCUMENTS

CN 103522088 A 1/2014
CN 104428081 A 3/2015
(Continued)

OTHER PUBLICATIONS

CN Office Action for CN Application No. 201610309094.X dated Jun. 14, 2017, 12 pages.
(Continued)

*Primary Examiner* — Erica E Cadugan
(74) *Attorney, Agent, or Firm* — Reising Ethington P.C.

(57) ABSTRACT

A die chanter for a die of a joining device, a die dome adapted to the die and a method for removing a die of a joining device and a method for inserting a die into a joining device. The die has a head having upper and bottom sides, and a shaft extending from the bottom side and receivable and lockable in a dome without rotation. The shaft comprises: at least one first web forming an undercut on two sides by which the shaft is lockable in the dome by a linear inserting movement, at least one second web, the length of which is adaptable to a diameter of the dome to ensure a lateral guiding of the shaft in the dome and which is arranged between the head and the first web, and an ejection surface by which the die can be moved out of the dome.

11 Claims, 15 Drawing Sheets

Figure 1:
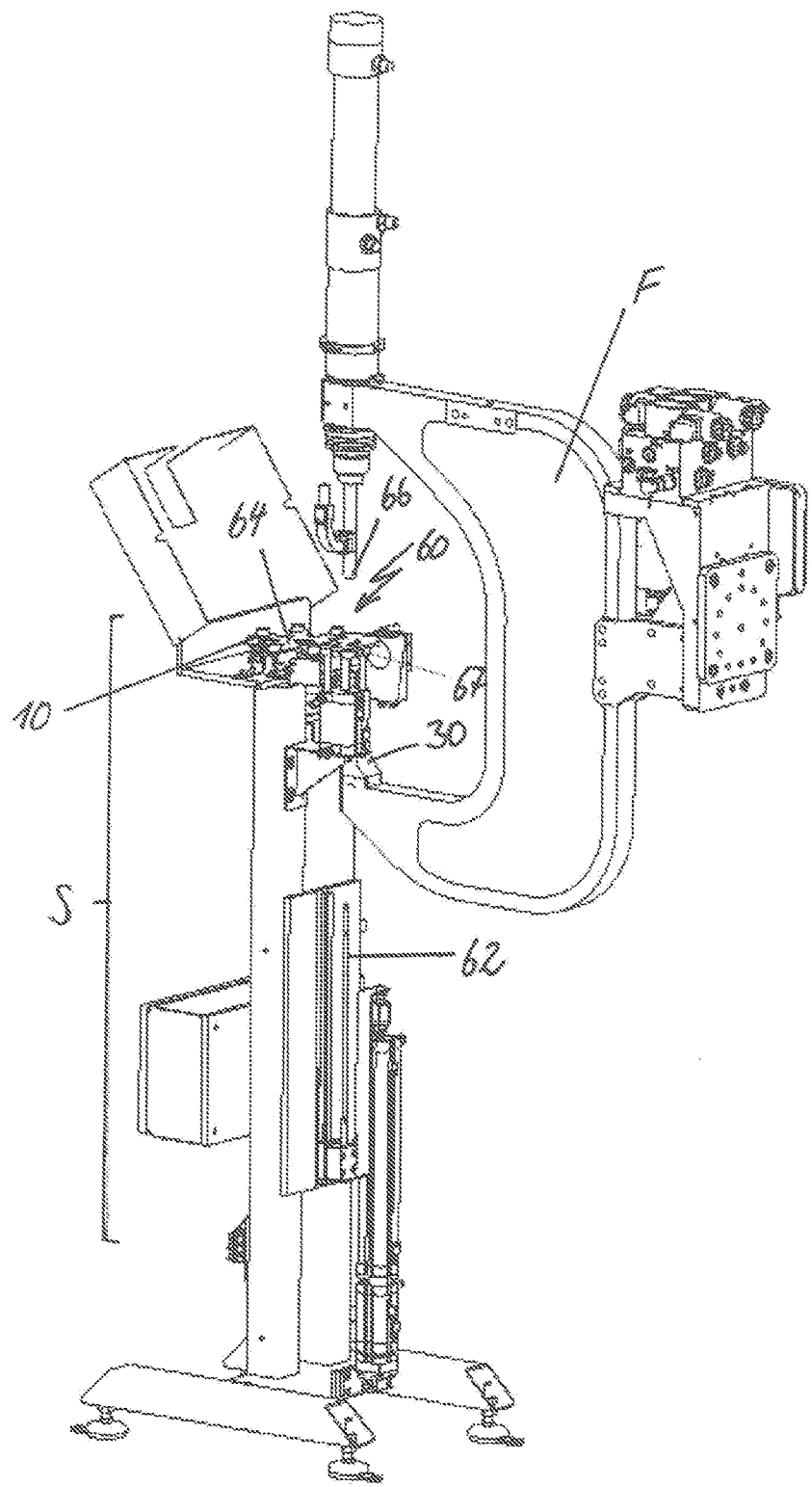

(51) Int. Cl.
*B21J 15/10* (2006.01)
*B21J 15/38* (2006.01)
*B21J 15/02* (2006.01)
*B21J 15/30* (2006.01)

(52) U.S. Cl.
CPC .............. *B21J 15/36* (2013.01); *B23Q 3/155* (2013.01); *B23Q 3/15503* (2016.11); *B23Q 3/15566* (2013.01); *B23Q 2003/1553* (2016.11); *Y10T 29/49943* (2015.01); *Y10T 29/49956* (2015.01); *Y10T 29/5377* (2015.01); *Y10T 483/10* (2015.01); *Y10T 483/1731* (2015.01)

(58) Field of Classification Search
CPC .... Y10T 29/49954–29/49957; Y10T 29/5118; Y10T 29/53709–29/53778; B23Q 3/15573; B23Q 3/1556; B23Q 3/155–3/15793; B23Q 3/15503
USPC .......................... 483/28–29; 29/524.1, 34 B, 29/243.5–243.55, 432–432.2
See application file for complete search history.

(56) References Cited

U.S. PATENT DOCUMENTS

| | | | |
|---|---|---|---|
| 5,685,812 A * | 11/1997 | Seto ....................... | B21D 28/12 483/28 |
| 6,106,446 A | 8/2000 | Kelly et al. | |
| 6,135,933 A | 10/2000 | Kelly et al. | |
| 6,910,263 B2 * | 6/2005 | Naito ...................... | B21J 15/025 29/243.53 |
| 7,328,640 B2 * | 2/2008 | Yeh ......................... | B21D 28/12 83/549 |
| 9,162,277 B2 | 10/2015 | Flis et al. | |
| 9,387,539 B2 | 7/2016 | Hangleiter et al. | |
| 2015/0052720 A1 | 2/2015 | Weyland | |
| 2016/0332216 A1 * | 11/2016 | Ahlemeyer ............ | B21J 15/025 |

FOREIGN PATENT DOCUMENTS

| | | | |
|---|---|---|---|
| DE | 10335085 | A1 * | 2/2005 |
| DE | 69916730 | T2 | 3/2005 |
| DE | 202006013082 | U1 | 11/2006 |
| DE | 102011105341 | A1 | 12/2012 |
| DE | 102011122093 | A1 | 6/2013 |
| DE | 102012101894 | A1 | 9/2013 |
| DE | 202014102908 | U1 | 7/2014 |
| DE | 102014202729 | A1 | 8/2014 |
| DE | 202013011927 | U1 | 10/2014 |
| DE | 202013011928 | U1 | 10/2014 |
| EP | 0216309 | A1 | 4/1987 |
| EP | 1467836 | B1 | 2/2007 |
| EP | 2679337 | A1 | 1/2014 |
| JP | 56-011127 | A * | 2/1981 |
| WO | WO2006089608 | A2 | 8/2006 |
| WO | WO2012175356 | A1 | 12/2012 |

OTHER PUBLICATIONS

EP Search Report for EP Application No. 16166640.9 dated Sep. 30, 2016, 14 pages.

* cited by examiner

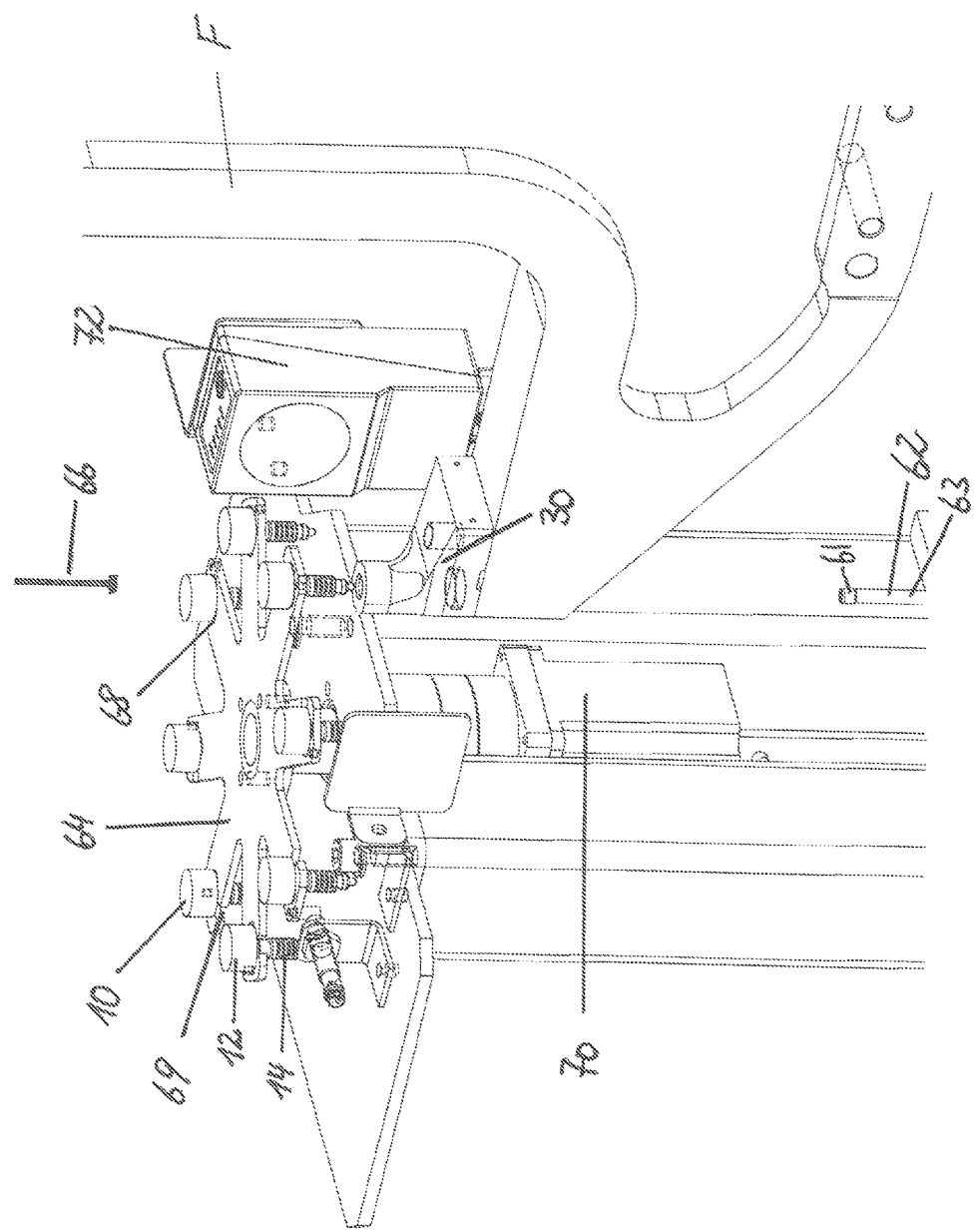

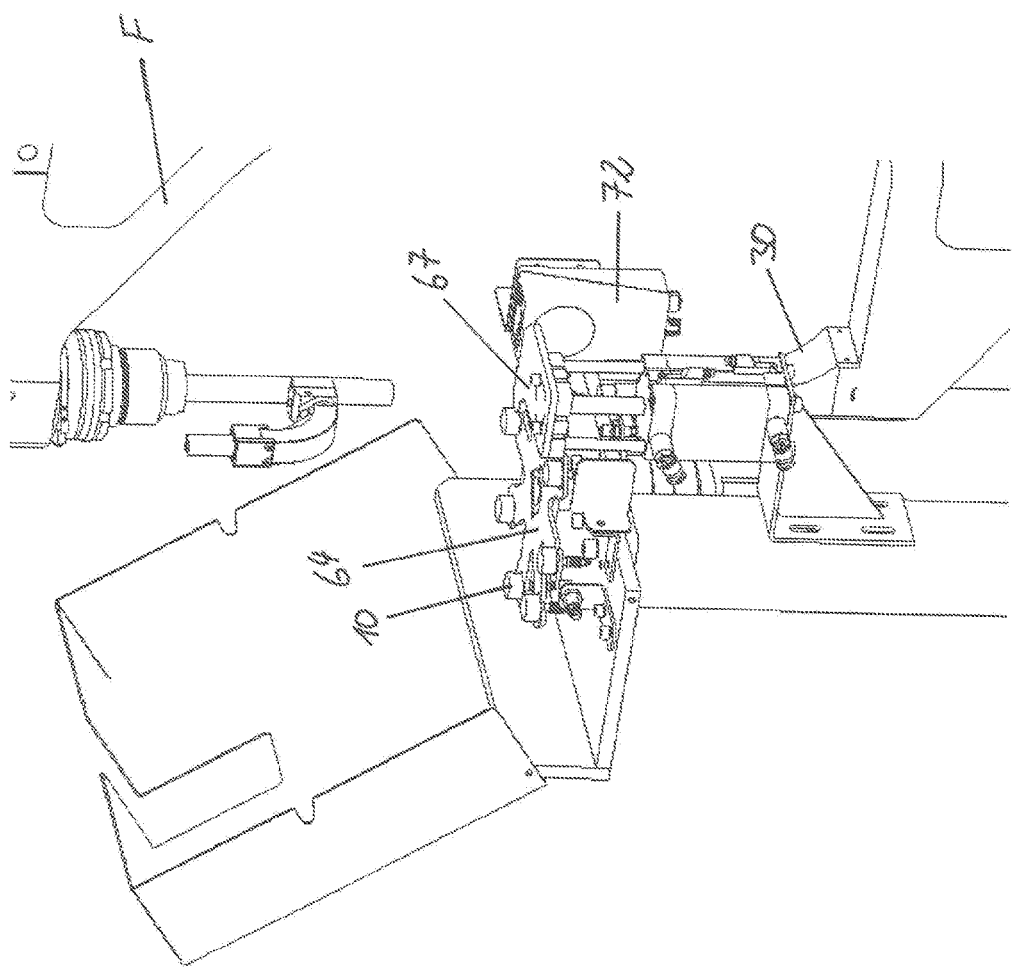

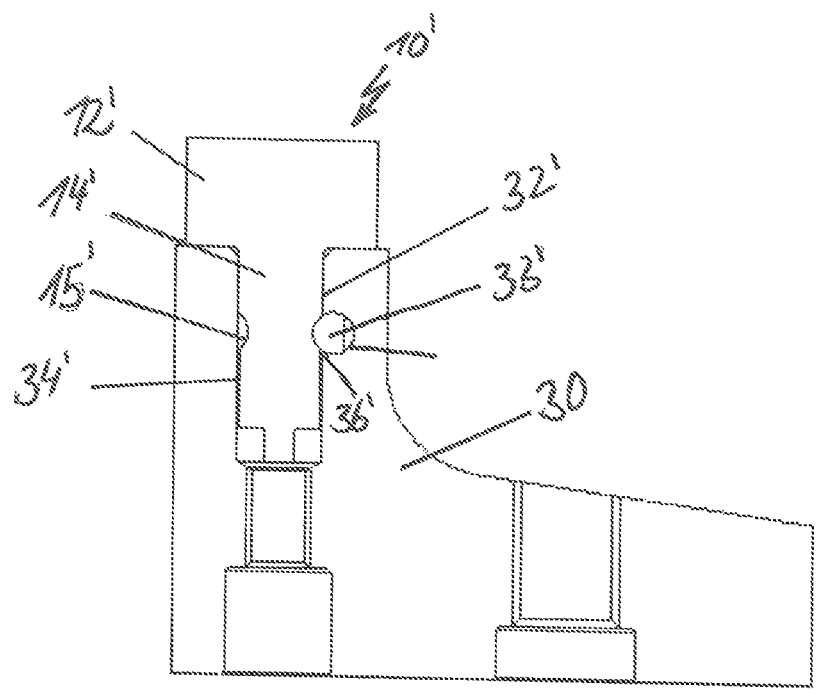
Fig. 5    A-A
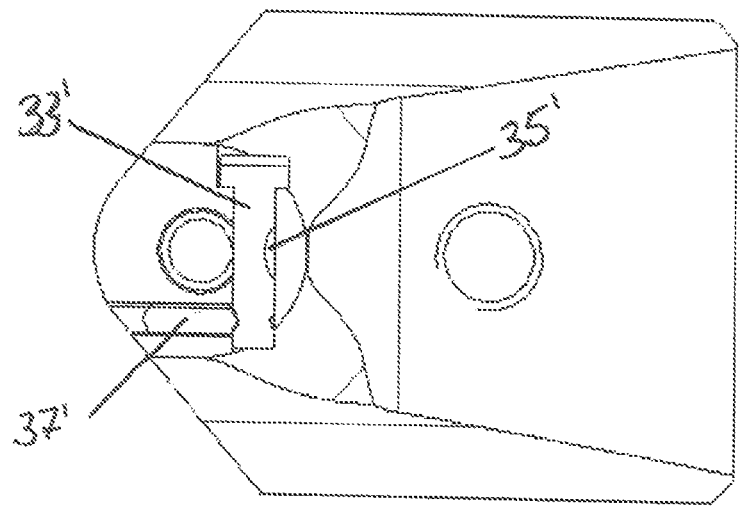
C-C
Fig. 6

DIE CHANGER WITH REMOVABLE DIE ADAPTED THERETO AND DIE DOME AS WELL AS METHOD FOR REMOVING AND INSERTING THE REMOVABLE DIE

CROSS REFERENCE TO RELATED APPLICATIONS

This application claims priority to German Patent Application No.: DE102015107337.4 filed May 11, 2015.

1. FIELD OF THE INVENTION

The present invention is related to a die changer for a removable die of a joining device, especially a setting device, the removable die which is adapted thereto as well as a die dome which is adapted to the removable die and a method for removing a removable die of a joining device as well as a method for inserting a removable die into a joining device.

2. BACKGROUND OF THE INVENTION

At the manufacturing of products having joining connections, it is meanwhile necessary that different materials, their combinations, different material thicknesses or different auxiliary joining parts have to be processed. This requires always an adapted joining device, as for example a setting device, at the manufacturing of motor vehicles. According to a procedure which is no longer up-to-date, rivet setting devices have been exchanged with each other according to the respective requirements for the joining connection to be produced. These different rivet setting devices used the appropriate auxiliary joining part and the respective die to connect the present components with each other.

For achieving here an increased flexibility, a die changer was used which was firmly installed on a C-frame of a setting device, for example according to EP 1 467 836 B1. This die changer consists of a disc-like rotatable arrangement on which two different dies are arranged. According to DE 10 2014 202 729 A1, also rotatable die discs are usable having three or four dies.

The manufacturing of joining connections meanwhile also takes place in production lines for the manufacturing of motor vehicles in which different vehicles are produced. This increases the requirements with respect to the flexibility of the joining devices, as for example setting devices. Further, welding connections are increasingly replaced by punch riveting connections for which also the appropriate setting devices have to be provided. For reducing the effort for a new installation of the setting devices for the manufacturing of all kinds of joining connections in the production line, it is necessary that the setting devices used have more flexibility in their adaptability to different joining connections.

Therefore, DE 20 2014 102 908 U1 discloses a die holder for a plurality of removable dies. This die holder cooperates with the die dome for receiving a removable die of a setting device which is moved to the die holder by means of a robot. The removable die in the die dome of the setting device is locked in the die dome by means of a rotational movement. The die holder provides a form-fit connection with the removable die by means of a lateral slotted die head. This form-fit connection ensures that the die holder can rotate the removable die for at least a quarter turn and thereby unlock in the die dome of the setting device. At the same time, by means of this rotation, the removable die is locked in the die holder axially. Now, die holder and die dome of the setting device are moved with respect to each other so that the removable die can be removed from the die dome of the setting device. In reversed order, the inserting of another removable die from the die holder into the die dome of the setting device occurs.

The die holder of DE 20 2013 011 927 U1 also receives a removable die from a die dome by means of a rotational movement. This rotational movement of the removable die, which is introduced into the removable die via the die head, requires specific gripping or connection mechanisms that support this rotational movement. Further, a sufficient accuracy at the combined rotational movement and the subsequent linear unlocking or releasing movement of the removable die are necessary which is on the one hand costly in its construction and which requires later high maintenance efforts. With respect to the maintenance, the contamination by and the removing of adhesive residues is, beside others, critical.

As has been mentioned above already, the removable dies are locked in the die dome by means of a combination of a linear movement and a rotational movement or they are withdrawn or removed from the die dome by means of a reversal of these movements. For this purpose, the removable die comprises a locking groove in its die shaft into which the webs of the die dome can engage. These webs are for example arranged oppositely to each other and are firmly installed in the die dome. To be able to insert the die shaft between these webs, it is formed tapered in a certain angular orientation. After rotating the removable die, the tapered shaft portion is oriented perpendicular with respect to the webs so that the die shaft is fixed in the die dome. The insertion depth of the die shaft as well as the rotation angle of the removable die have to be adapted precisely to the removable die to be able to establish a reliable connection between the die dome and the removable die also upon repeated inserting and removing of a removable die. Further, bayonet-like connections between removable die and die dome are disclosed. These are not only susceptible due to the complex movement sequences for locking and unlocking the die in the die dome but also due to a contamination which may deposit in the bayonet connection.

For being able to differentiate the several removable dies stored in the die holder, DE 20 2013 011 928 U1 describes an identification code arranged at the die head or at the die shaft. This identification code is especially arranged at the radially outer side of the die head or the die shaft. Although this identification code, like a bar code, a number code or a two-dimensional code, is detectable by a camera, a scanner or another suitable sensor, these identification codes are susceptible to damaging. Because a rotational movement occurs upon the take-over or receipt of the removable die by the die holder during which the die holder engages at the radially outer side of the die head. During this movement, the identification codes arranged at the die head are damaged. The identification codes arranged at the die shaft are stressed by a frictionally engaged connection of the die shaft at the radially inner side of the die dome. This frictional engagement leads also to a damaging of the identification codes so that the identification codes cannot be read or are not identifiable anymore after several changes of the removable die.

It is, thus, the object of the present invention to provide a die changer with a removable die adapted thereto and an adapted die dome which has, with the same flexibility, a lower susceptibility to failures and, thus, a higher lifetime compared to the prior art. The same applies also to the used removable dies so that they are usable for a higher number of changing cycles without that a damaging in the fixing mechanism and/or in the identification of the removable die occurs. Further, it is an object of the present invention to provide a simplified method for removing a removable die from a die dome of a joining device as well as a simplified method for inserting a removable die into a die dome of a joining device.

3. SUMMARY OF THE PRESENT INVENTION

The above objects are solved by a method for removing a removable die of a joining device according to the present invention and by a method for inserting a removable die of a joining device according to the present invention. Advantageous embodiments and developments of the present invention result from the following description, the accompanying drawings as well as the appending patent claims.

The present invention discloses a removable die of a joining tool, especially a setting device, comprising a die head having an upper side and a bottom side as well as a die shaft extending perpendicular from the bottom side of the die head and being adapted to be receivable and lockable in a die dome without rotation. The die shaft of the removable die comprises the following features: at least one first radial web forming at least an axial undercut on one side by means of which the die shaft is lockable in the die dome solely by means of a linear inserting movement, at least one second radial web, the radial length of which is adaptable to a diameter of the die dome for ensuring a lateral guiding of the die shaft within the die dome and which is arranged between the die head and the first radial web, as well as an ejection surface by means of which the removable die can be moved out of the die dome and which is arranged adjacent to the free end of the die shaft opposite to the die head.

The inventive removable die is configured such that the removable die is lockable solely by means of a rotation-free axial inserting of the die shaft into a die dome and is thus arrangeable in the joining device. This is realized in that the die shaft comprises a first radial web at which a snap-in locking mechanism of the die dome is lockable on one side or on both sides. Due to the exposed position of the first radial web, it forms an axial undercut preferably with a side facing the die head and with a side facing away from the die head, respectively, wherein said first radial web prevents a moving of the removable die in axial direction after locking with the die dome. This ensures a secure seat in the die dome. At the same time, the die shaft is guided laterally by means of the second radial web so that the die shaft and, thus, the removable die is receivable and can be held in the die dome fitting exactly. Further preferred, the removable die is ejectable from the die dome in axial direction opposite to the insertion direction and preferably free of rotation by means of the ejection surface. To this end, an ejection spike engages at the ejection surface. According to a preferred embodiment, the ejection surface is arranged at the end of the removable die opposite to the die head and forms an abutment or contact point for an axially slidable or movable ejection spike. According to a further preferred embodiment of the present invention, the first radial web forms the ejection surface at least partly with an axial side surface facing away from the die head. Preferably, the ejection surface is used in combination with a die shaft extending axially beyond the first radial web. The die shaft engages preferably in a central opening of the ejection spike for ejecting the removable die.

Preferably, the removable die comprises a die coding which is arranged on or at the die shaft and which is optically evaluable. According to a preferred embodiment of the present invention, a radial tapering section having a smaller radial extension than the second radial web is provided at the die shaft for protecting the die coding. Due to the arrangement of the die coding on this radial tapering, the die coding is arranged protected as the die coding is neither engageable by the die holder nor by the die dome.

According to a further preferred embodiment of the present invention, a third radial web is provided as die coding. The third radial web comprises an adjustable axial length and at least one radial puncture extending in radial direction. The combination of radial web and puncture appears in a side view similar to a barcode and is usable as die coding. An individual identifier of the removable die created in this way is detectable preferably optically by a camera or a scanner. Further, this type of die coding is not susceptible to contamination. According to different preferred embodiments of the present invention, the third radial web is adapted to the diameter of the through-opening to provide a radial support for the die shaft. According to other embodiments, the third radial web is smaller in the outer diameter than the inner diameter of the through-opening for not damaging the die coding.

Further preferred, the die head comprises a radially tapered axial section forming the second radial web, extending in the direction of the die shaft and being adaptable in a radial extension to the diameter of the die dome. According to this preferred constructive embodiment of the die shaft, it is guided laterally in the opening of the die dome at least at two locations.

The present invention comprises also a die dome of a joining device, especially a setting device, in which a die shaft of a die, especially a removable die according to one of the above described embodiments, is receivable and lockable without rotation. The die dome comprises the following features: a hollow cylindrical through-opening for receiving and guiding the die shaft comprising an axially guiding section and an axially locking section adjacent thereto, wherein in the locking section a form-fit acting and spring-pre-tensioned locking arrangement is provided and configured such that a die shaft is automatically lockable in the locking arrangement by means of a rotation-free inserting of the die shaft in an insertion direction into the locking section and is automatically unlockable from the locking arrangement and removable from the die dome by means of inserting an ejection spike into the through-opening in an ejection direction opposite to the insertion direction.

The hollow cylindrical through-opening of the die dome acts at the same time for arranging the removable die in the accurate position as well as for removing the removable die by inserting an ejection spike from the opening of the through-opening facing away from the removable die. By means of this construction as well as the locking arrangement provided in the die dome, the die dome is adapted to the removable die such that an arranging, locking and removing of the removable die can take place solely by means of an axial movement of the die shaft within the die dome and of the ejection spike within the die dome. This avoids the necessity of rotational movements which have to be transferred to the removable die for locking or unlocking and removing. Further, the movement sequences necessary for inserting and removing the removable die from the die dome is simplified and its duration is shortened. Furthermore, the here used construction is constructed simply and requires low maintenance costs compared to the rotating locking arrangements of the prior art.

According to a preferred embodiment of the inventive die dome, the locking section comprises at least one holding shell, preferably a plurality of holding shells comprising each at a radial outer side a tilting web so that an inner side of the holding shells is pivotable around the tilting web.

The used at least one or plurality of holding shells in the locking section of the die dome is configured in its shaping such that a preferred axial ramping surface in combination with the mentioned tilting web causes a displacement of the respective holding shell radially outwardly. If, thus, preferably the die shaft is inserted in the through-opening of the die dome, then the axial ramping surface at a radial inner side of the holding shell/holding shells supports the inserting or receiving of the die shaft in the at least one holding shell. At the same time, the at least one holding shell is preferably pressed radially outwardly by the ejection spike. Thereafter, preferably the plurality of holding shells or the at least one holding shell locks automatically at the first radial web of the die shaft. Preferably according to the invention, the mentioned ramping surface is provided at the holding shells or at the end of the die shaft. If the ejection spike is moved through the through-opening against the insertion direction of the removable die, it is also preferred that the holding shells are automatically opened by the ejection spike due to a ramping surface and that the removable die is thereby removable from the through-opening of the die dome. Also in this context, it is inventively preferred to provide the ramping surface at a guiding section of the ejection spike, at the holding shells or combined at both.

For the preferred supporting of the locking and unlocking of the removable die in the die dome, the holding shells are spring pre-tensioned into an initial position preferably axially spaced from the tilting web so that the holding shells can pivot automatically back into the initial position after a radially outwardly pivoting. According to a further preferred embodiment of the inventive die dome, the locking section has a greater diameter than the guiding section in the through-opening and the holding shells are arranged in the locking section positively or in a form-fit manner by means of an insert element. Further preferred, the plurality of holding shells, preferably two holding shells, define an at least two-stage through-opening in the die dome between the holding shells which have adjacent to the tilting web a greater diameter than remote from the tilting web and which comprise remote from the tilting web a radially inwardly protruding snap-in locking structure, especially a snap-in locking web or a snap-in locking groove.

Preferably, the holding shells are adapted in their configuration to the locking of the die shaft as well as to the unlocking of the die shaft by the ejection spike. The locking of the die shaft is realized by a radially inwardly protruding snap-in locking web or the mentioned snap-in locking groove, which engages upon locking of the die shaft at the first radial web of the die shaft. Depending on the configuration and/or load of the removable die, it is preferred that a one-sided or a two-sided axial undercut of the first radial web is used by the abutting of the radially inwardly protruding snap-in locking structure of the holding shell.

The preferred at least two-stage through-opening between the or enclosed by the holding shells is adapted in its configuration to the preferred shape of the ejection spike. It comprises also at least a two stage configuration in which preferably the guiding end of the ejection spike has a greater diameter than a section of the ejection spike following the ejection end. These different configurations of the diameters in the through-opening of the plurality of holding shells as well as in the configuration of the ejection spike ensure the axial ejecting of the removable die from the die dome without that a rotation of the removable die has to occur.

The present invention comprises also a die dome of a joining device, especially a setting device, in which a die shaft of a die is receivable and lockable without rotation. The die dome comprises the following features: a hollow cylindrical through-opening for receiving and guiding the die shaft which comprises an axial guiding section and an axial locking section adjacent thereto, wherein in the locking section, a form-fit or positively acting locking arrangement with a rotatable and/or shiftable locking element is provided so that a die shaft is lockable and unlockable therein by means of a rotation-free inserting of the die shaft in the locking section in an insertion direction and by rotating and/or shifting the locking element and is removable from the locking arrangement and the die dome by means of a plugging in of an ejection spike into the through-opening in an ejection direction opposite to the insertion direction.

The present invention comprises an alternative configuration of a die dome of a joining device. In this die dome, the removable die is also insertable and lockable therein without rotation. For providing the locking of the die shaft in the through-opening of the die dome, a locking element is arranged in the locking section. Upon the preferred rotation of the locking element around a longitudinal axis of the locking element, the through-opening of the die dome is specifically blockable or releasable. This functionality is preferably realized in that the locking element, which is formed pin-like, comprises a radially asymmetric tapering. As the pin-like locking element extends partly through the through-opening of the die dome, a rotating of the locking element around the longitudinal axis realizes a blocking or a releasing of the through-opening of the die dome.

The present invention comprises further a die changer for a removable die of a joining device, especially a setting device, which is arrangeable in a die dome of the joining device having a through-opening, wherein the die changer comprises the following features: a die holder having at least one holding opening adapted to the removable die such that a die shaft is receivable in the holding opening and a die head is supportable at an edge of the holding opening, wherein the holding opening has a radial clearance for radially inserting the die shaft into the holding opening, and an axially moveably arranged ejection spike adapted to the die dome such that the ejection spike is movable completely through the through-opening of the die dome to eject a removable die from the die dome.

The already above described die dome as well as the removable die are used in combination with an ejection spike and the die holder. The die holder comprises a plurality of holding openings for the removable dies to be inserted into or to be removed from the die dome. Preferably, the holding openings of the die holder and the shaft of the removable die are movable with respect to each other so that the shaft of the removable die is insertable into the holding opening of the die holder and the removable die is lowerable into the holding opening in this position.

According to a preferred embodiment of the inventive die changer, the die holder comprises a rotatably arranged disc having a plurality of holding openings, the holding openings of which are movable specifically adjacent to the die dome. Due to the movement of the ejection spike, the removable die is raised or lifted into a position above the die dome so that it is arranged in lateral alignment with the radial clearance of the holding opening of the die holder. The relative movement between holding opening and removable die makes then the arrangement of the removable die in the holding opening of the die holder possible.

Further preferred, the die changer comprises a fixing spike arranged axially movable coaxially or parallel to the ejection spike or a respective fixing device, which is adapted to engage at an upper side of the removable die and to move matched to the ejection spike. For ensuring the position of the removable die and to avoid an uncontrolled ejecting of the removable die from the die dome due to the movement of the ejection spike, a fixing spike or a fixing device fixes the removable die at the upper side of the removable die. By means of this fixing, the fixing spike or the fixing device presses the removable die against the ejection spike without limiting or blocking the movement of the ejection spike. Inventively preferred, the movements of the ejection spike and the fixing spike or the fixing device are matched to each other so that they move preferably synchronously with respect to each other. Due to the usage of the fixing spike it is achieved that the removable die always has a defined position during its movement by means of the ejection spike.

The present invention comprises also a system for changing a removable die at a joining device, especially a setting device, comprising a joining device having a die dome according to the above described embodiments and a die changer according to the above described embodiments, which are preferably adapted to remove a removable die according to the above described embodiments from the die dome or to insert it therein.

Further, the present invention comprises a method for removing a removable die of a joining device fastened in a die dome having a through-opening. The method comprises the following features: arranging the die dome, especially a die dome according to one of the above described embodiments, above an ejection spike, moving the ejection spike without rotation through the die dome, wherein the ejection spike releases the removable die without rotation from a locking section of the die dome, moving the removable die with the ejection spike beyond the die dome into lateral alignment with a holding opening of a die holder of a die changer, especially a die changer according to one of the above described embodiments, relatively moving of die holder and removable die with respect to each other so that the removable die is arranged without rotation in the holding opening of the die holder, and inserting of the removable die into the holding opening without rotation by axially moving the ejection spike. According to a further inventively preferred embodiment of the present method, the following steps are provided: moving a fixing spike or a fixing device into abutment with an upper side of a die head of the removable die, preferably before the ejection spike moves the removable die, and holding or retaining the removable die between ejection spike and fixing spike or fixing device during the moving of the removable die to the holding opening of the die holder. Further, and during the inventive method for removing the removable die, preferably the ejection spike is moved into a through-opening formed from several holding shells in the locking section of the die dome and the ejection spike unlocks there the removable die, especially the die shaft, by means of a pivoting of the holding shells by the ejection spike.

The present invention comprises also a method for inserting a removable die of a joining device, especially a setting device, having a die dome with through-opening, wherein the method comprises the following steps: arranging a holding opening of a die holder, especially a die holder of a die changer according to one of the above described embodiments, which contains a removable die, above an ejection spike which has been moved through the through-opening of the die dome, preferably rotation-free releasing of the removable die from the holding opening by a movement of the ejection spike, removing the holding opening from the released removable die and moving the ejection spike through the through-opening of the die dome, wherein the removable die locks, preferably without rotation, in a locking section of the die dome. The method for inserting the removable die into the joining device occurs inventively preferred according to a kinematic reversal of the method for removing the removable die from the die dome of the joining device. Therefore, it is also preferred to press the removable die by means of a fixing spike or a fixing device into the locking section of the die dome with at least one holding shell.

4. SHORT DESCRIPTION OF THE ACCOMPANYING DRAWINGS

Figure 3A:
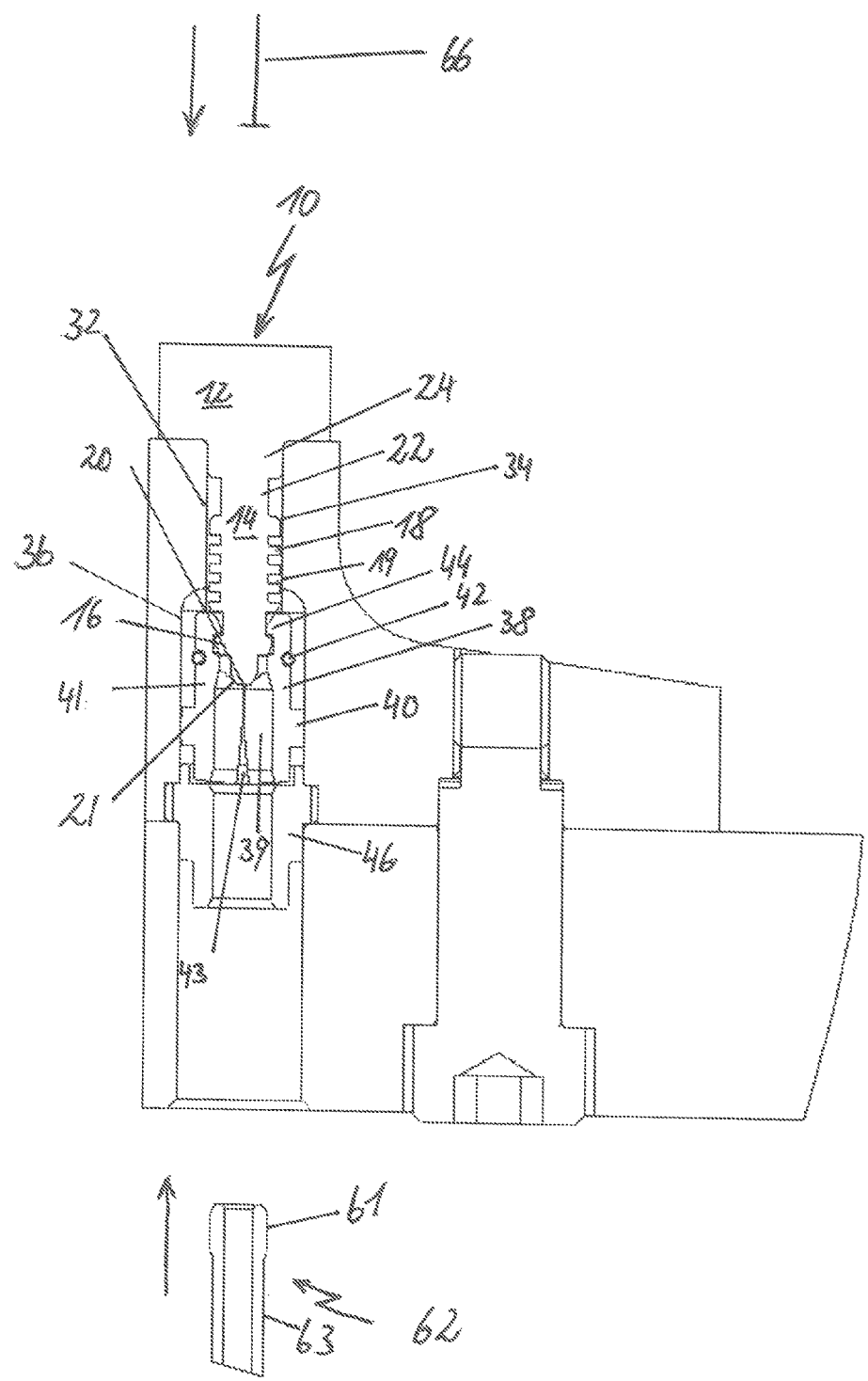
Figure 3B:
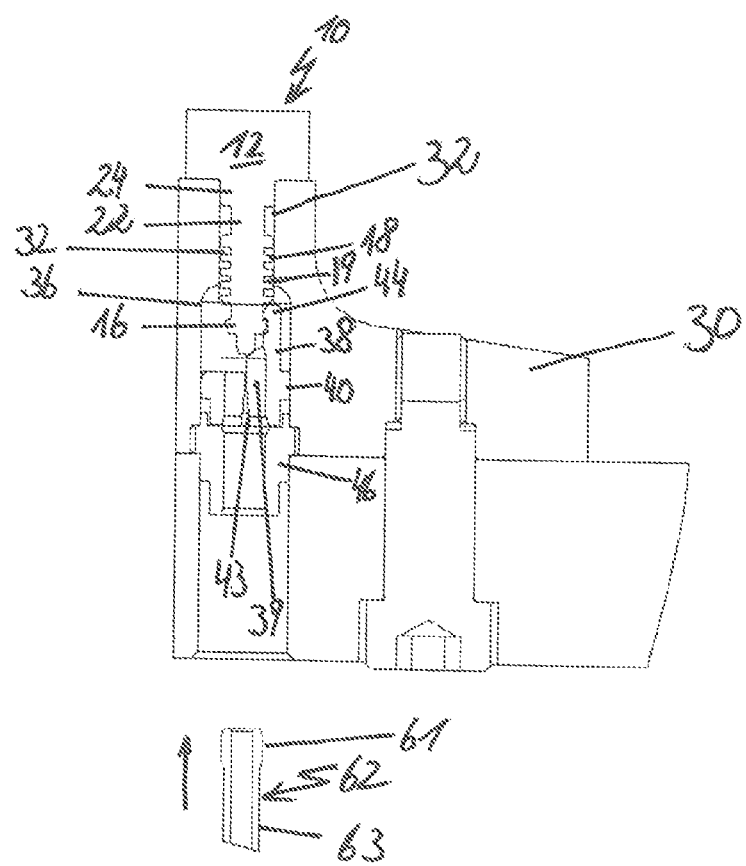
Figure 4:
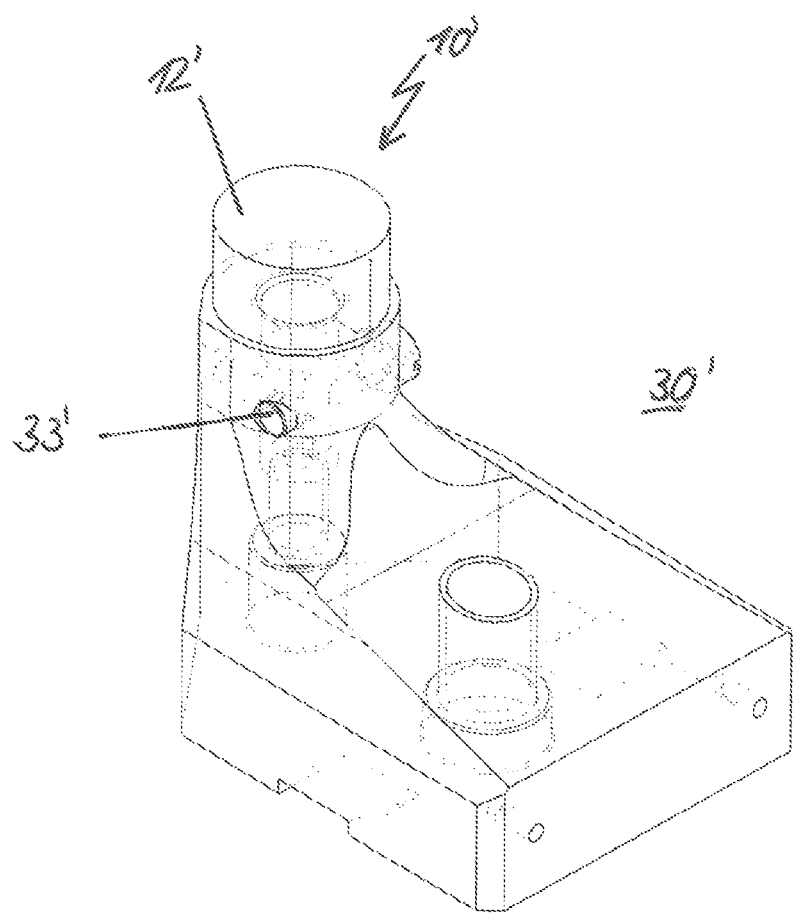
Figure 7:
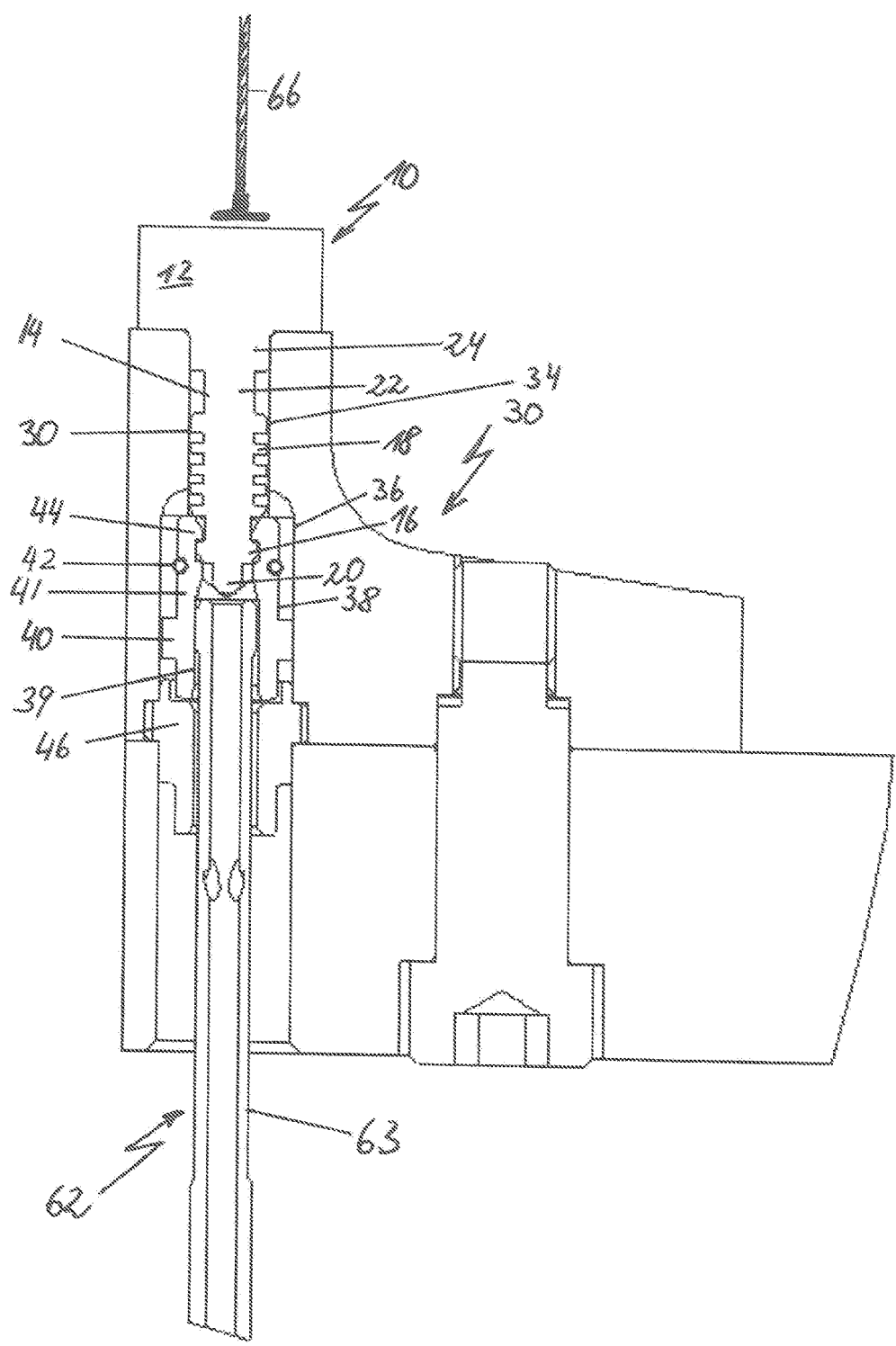
Figure 8:
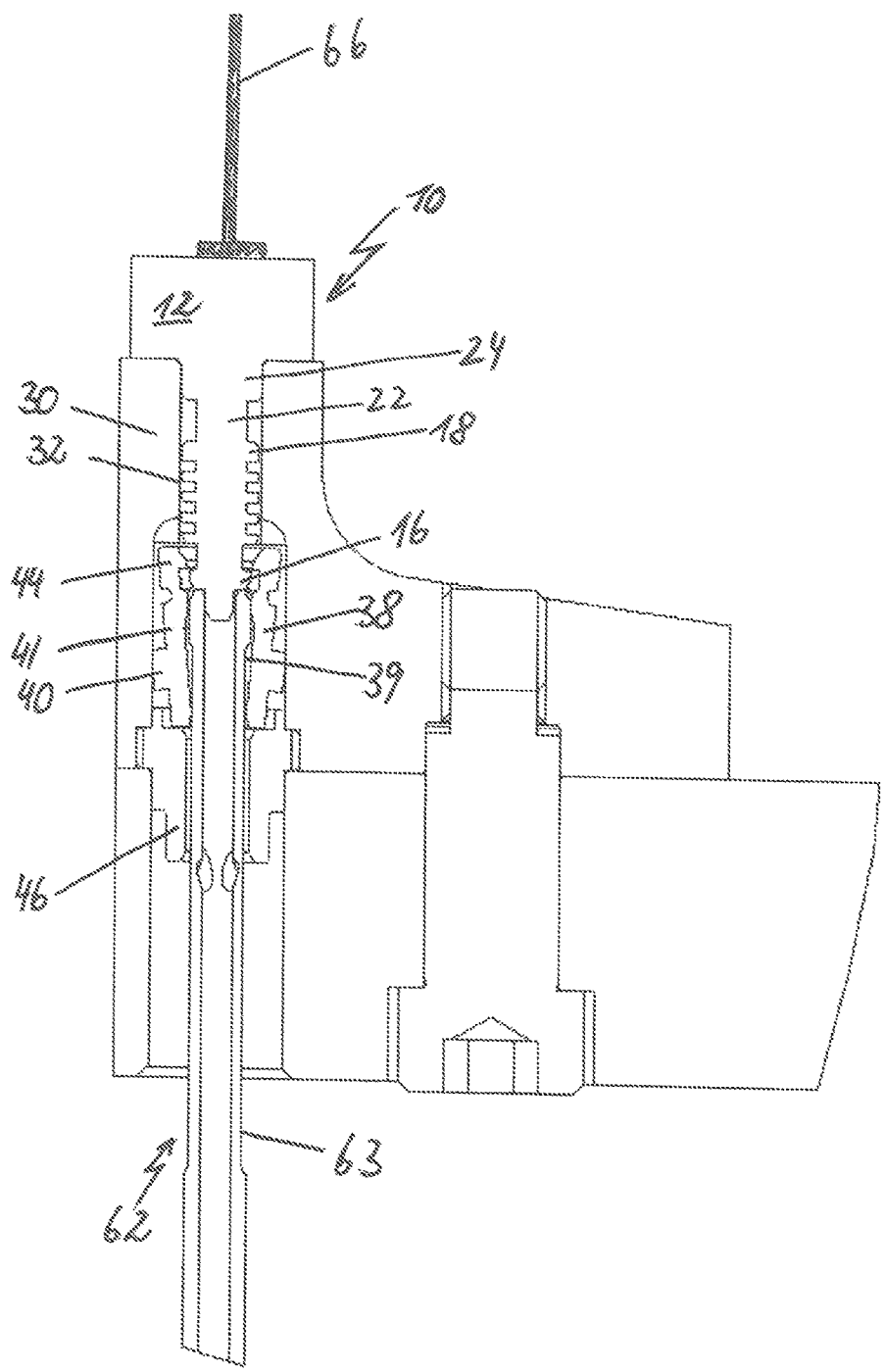
Figure 9:
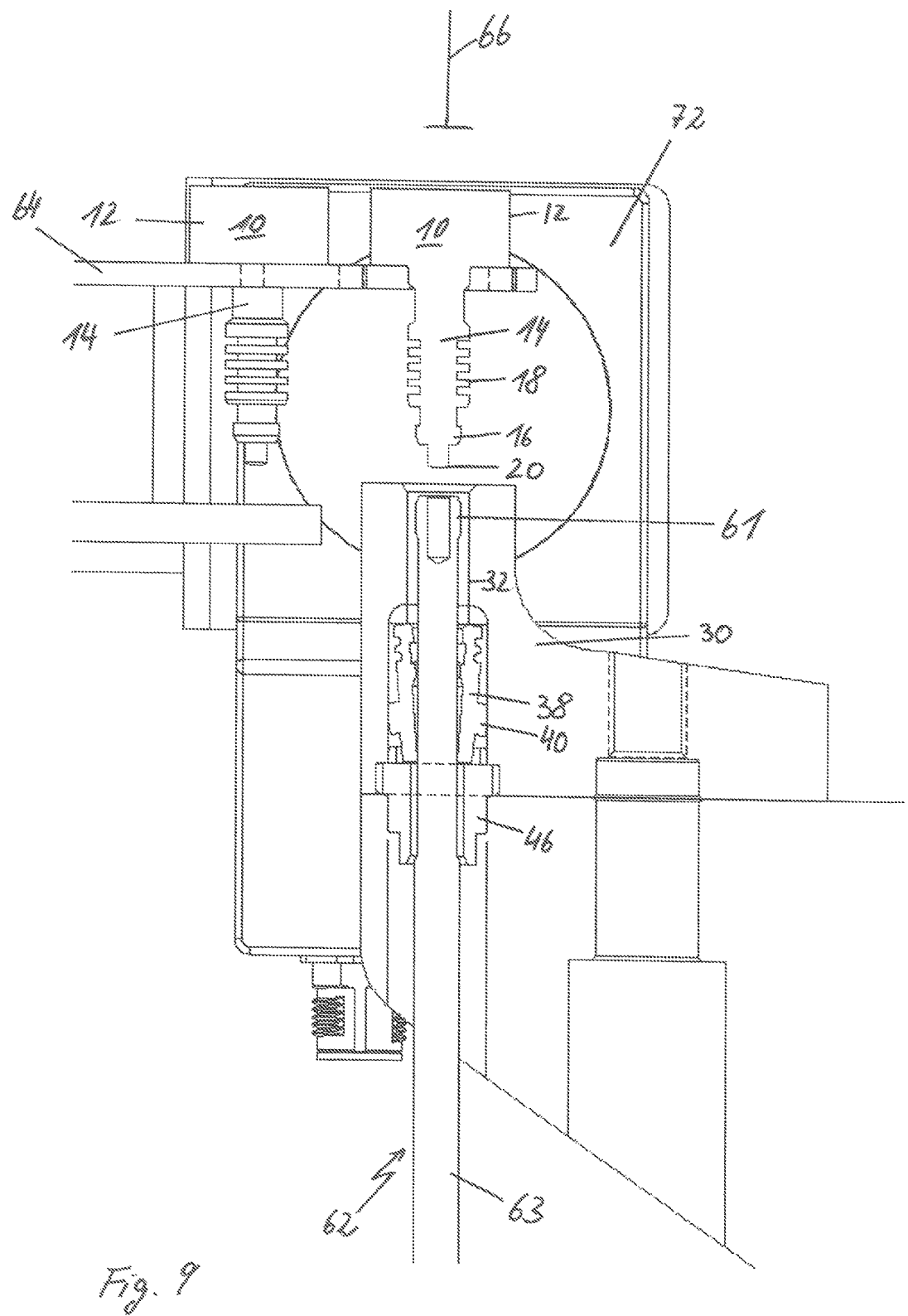
Figure 10:
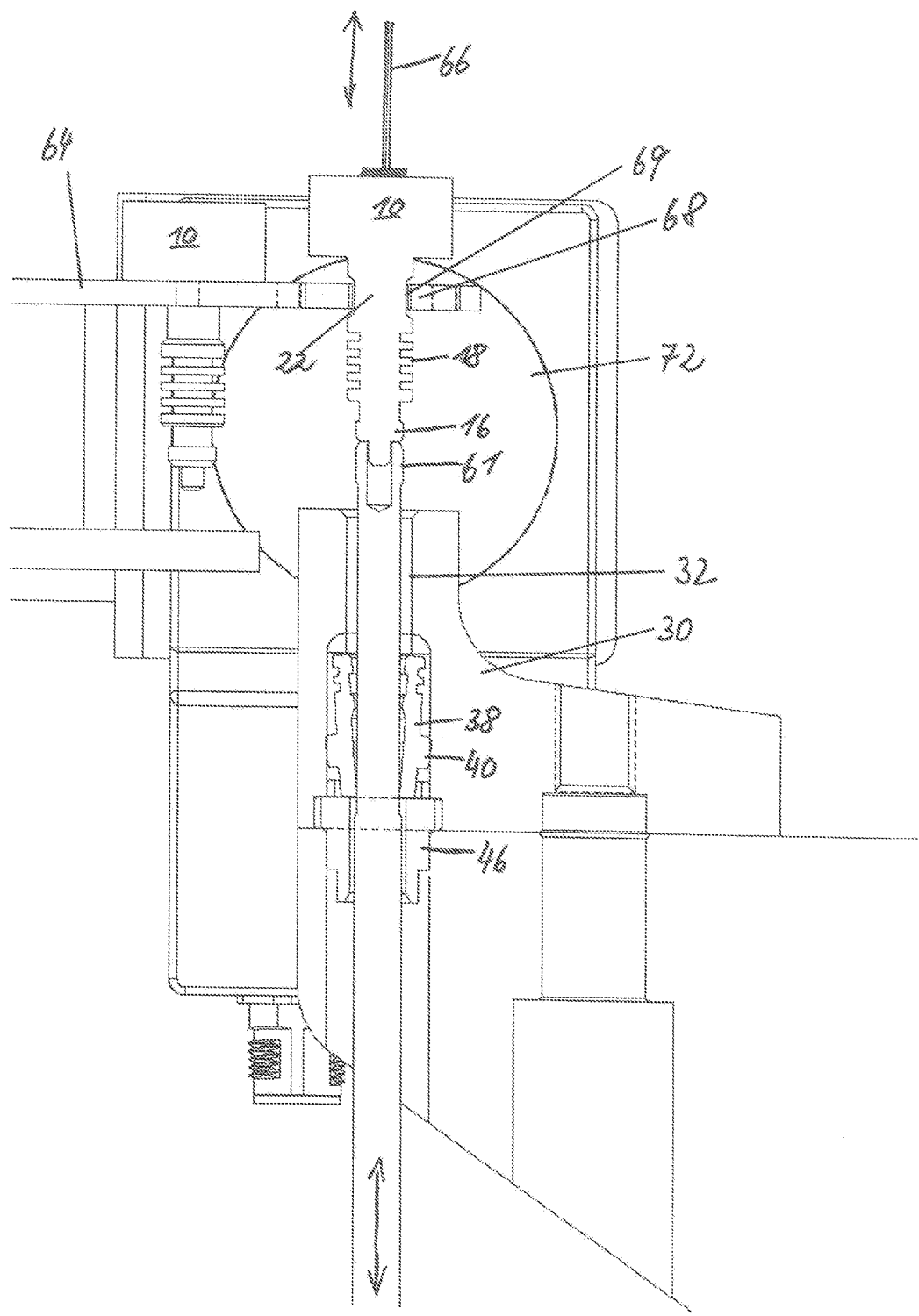
Figure 11:
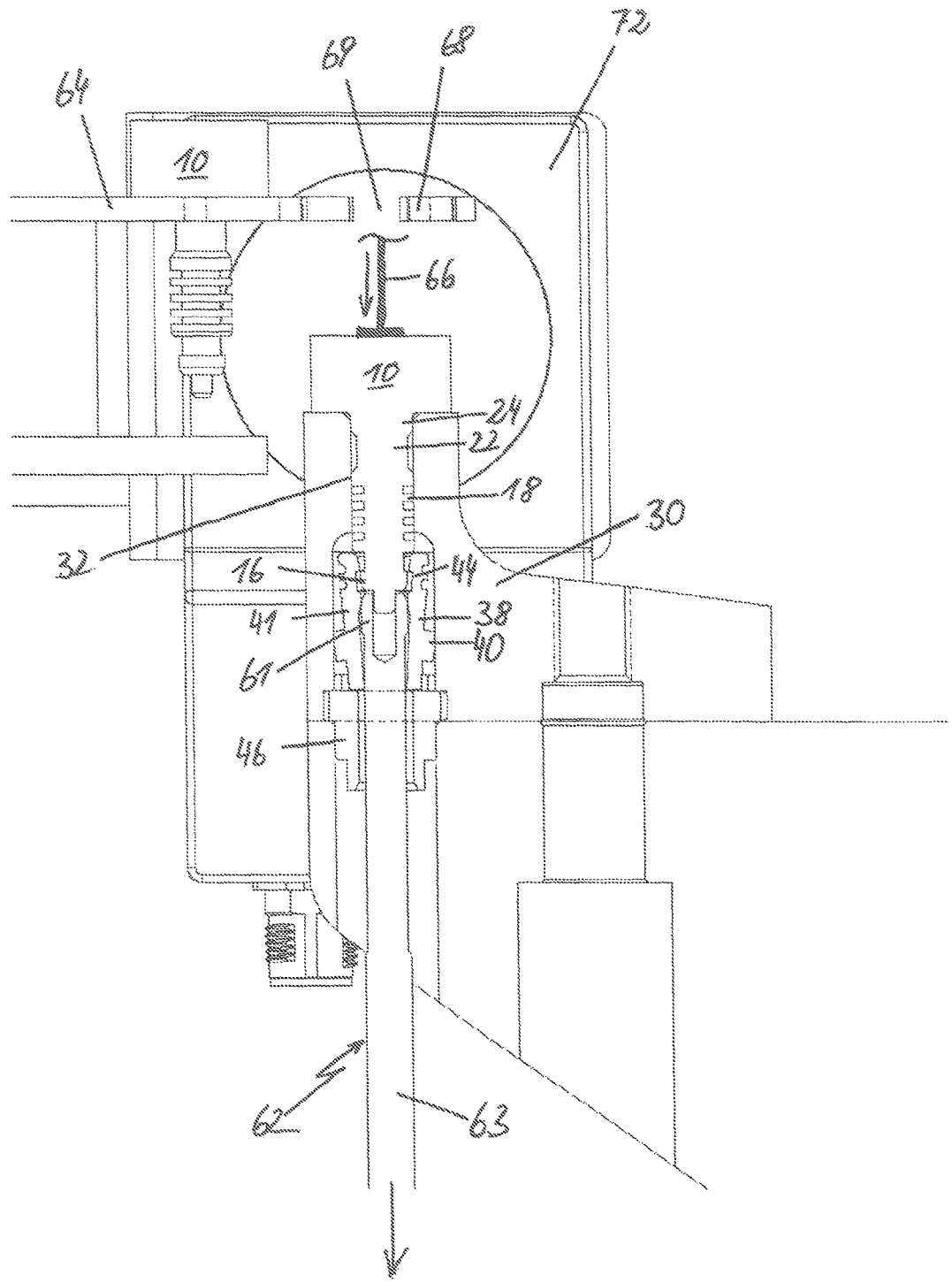
Figure 72:
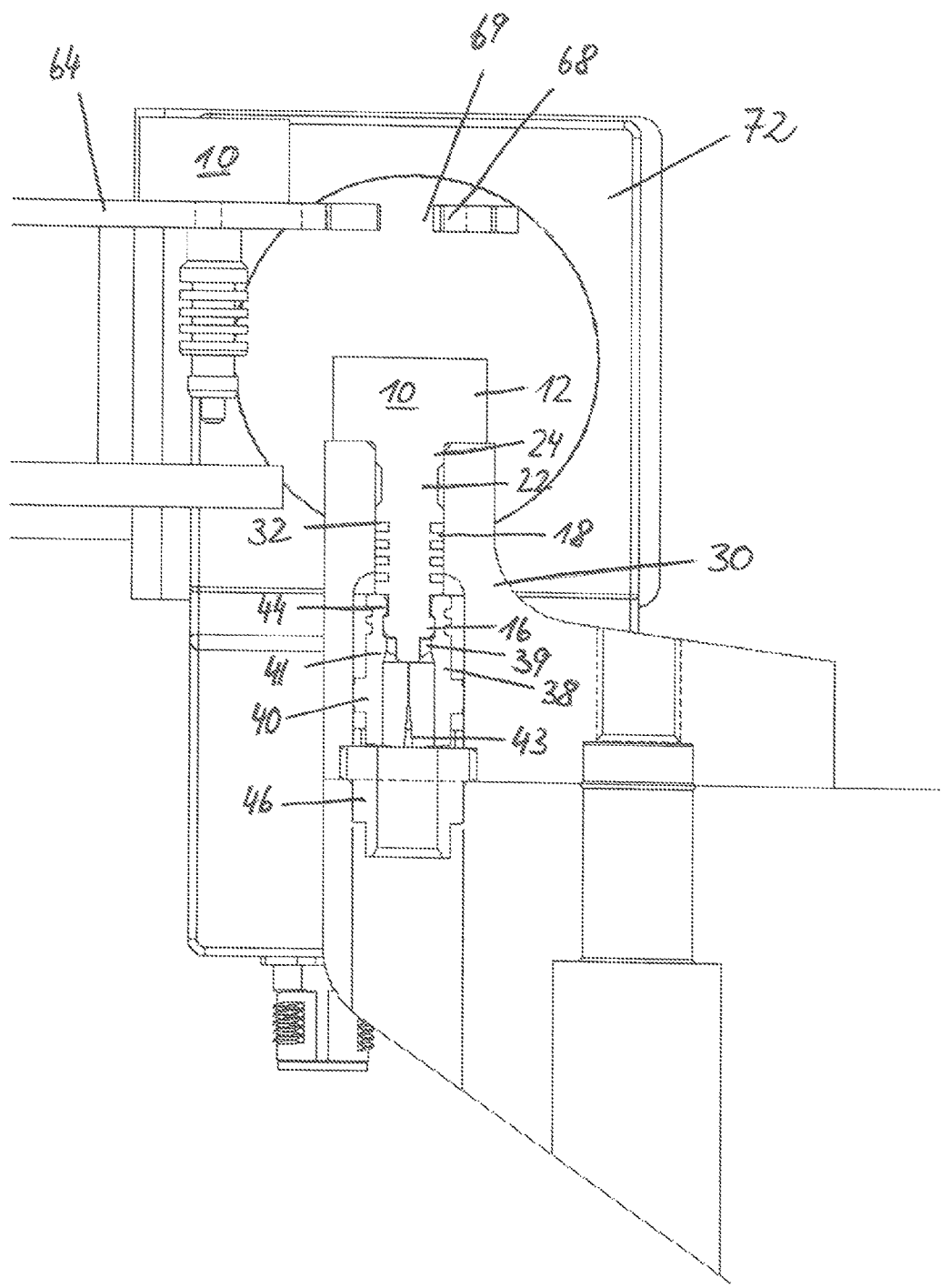
Figure 13:
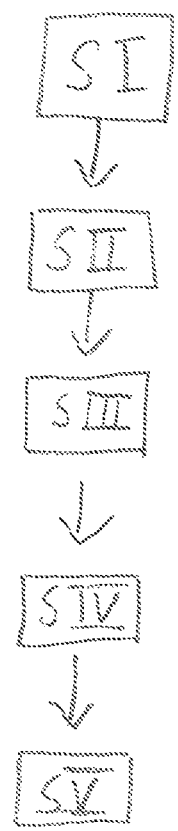
Figure 14:
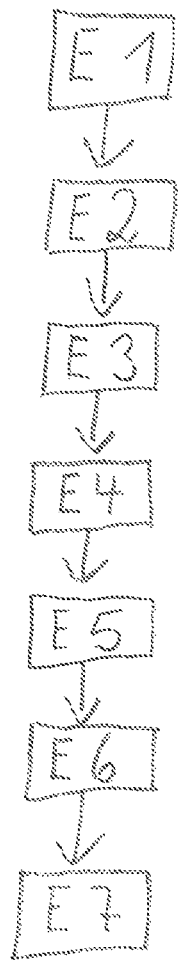

The preferred embodiments of the present invention are explained in detail with respect to the accompanying drawings. It shows:

FIG. 1 a perspective overview of a preferred system consisting of joining device with die dome, removable die and die changer FIG. 2a an enlarged depiction of a preferred embodiment of the die changer having a fixing spike, FIG. 2b an enlarged depiction of a preferred embodiment of the die changer having a fixing device, FIG. 3a an enlarged depiction of a first preferred embodiment of an inventive die dome with two holding shells and removable die arranged therein, FIG. 3b an enlarged depiction of a second preferred embodiment of an inventive die dome having one holding shell and removable die arranged therein, FIG. 4 a preferred alternative embodiment of a die dome with removable die in perspective view, FIG. 5 a lateral sectional view of the die dome of FIG. 4, FIG. 6 a radial sectional view of the die dome according to FIG. 4, FIG. 7 an enlarged depiction of the die dome according to FIG. 3a at which a preferred ejection spike is being inserted into the die dome, FIG. 8 a further sequence of a preferred ejection procedure of the removable die from the die dome, wherein the ejection spike is moved further into the through-opening of the die dome subsequently to the sequence of FIG. 7, FIG. 9 a lateral sectional view of a preferred arrangement of the die dome with ejection spike adjacent to the die changer before the ejection spike withdraws or removes a removable die from a die holder, FIG. 10 the arrangement of FIG. 9, in which the ejection spike engages the removable die and lifts the removable die from the die holder, FIG. 11 the preferred arrangement of FIG. 9, wherein the ejection spike has lowered the removable die into the die dome completely, FIG. 12 the preferred arrangement according to FIG. 11, wherein the removable die has been locked in the die dome and the ejection spike has been removed from the die dome, FIG. 13 a flowchart of a preferred embodiment of a method for removing a preferred removable die of a joining device from a preferred die dome, and FIG. 14 a flowchart of a preferred embodiment of a method for inserting a removable die of a joining device in a preferred die dome.

5. DETAILED DESCRIPTION OF THE PREFERRED EMBODIMENTS

FIG. 1 shows a perspective overview of a joining device F in combination with a die changer 60. The joining device F is indicated by a C-frame of a setting device. All devices are conceivable as joining devices which use a die, no matter if the joining procedure is performed with or without auxiliary joining part. Such joining devices are for example a setting device for punch rivets, a joining device for clinching or the like. In the following, and for explanation reasons, it is referred to a setting device for punch rivets in combination with a C-frame.

The setting device is arranged at an open end of the C-frame, wherein a removable die 10 is provided in a die dome 30 at the other open end of the C-frame. The removable die 10 is removably or exchangeably fixed in the die dome 30. This replacement or exchange takes place by means of a die changer 60 preferably comprising an ejection spike 62.

The ejection spike 62 is linearly, and preferably without rotation, movable through a hollow cylindrical through-opening 32 of the die dome 30 (SII) after the die dome 30 has been positioned above the ejection spike 62 (SI). At that, the ejection spike 62 removes the removable die 10 from the die dome 30 and positions it adjacent to a die holder 64 (SIII).

The die holder 64 contains at least one holding opening 68 in which the removable die 10 can be arranged. The holding opening 68 and the removable die 10 are moved relatively to each other so that the removable die 10 is arranged within the holding opening 68. For this purpose, the holding opening 68 comprises preferably a radial clearance 69 by means of which the shaft 14 of the removable die 10 can be inserted into the holding opening 68 (SIV). Preferably the removable die 10 is stored in the holding opening 68 by means of a movement of the ejection spike 62 in the direction of the die dome 30 (SV).

With this preferred method for removing the removable die 10 from the die dome 30, which will be explained in greater detail below, preferably the removable die 10 is fixed or stabilized at the ejection spike 62 by means of a fixing spike 66 (see FIG. 2a) or a fixing device 67 (see FIG. 2b). The fixing spike 66 or the fixing device 67 engages for this purpose at an upper side of the die head 12. Thereby, and due to an engagement or abutment of the ejection spike 62 at the removable die 10, the removable die 10 is held between the ejection spike 62 and the fixing spike 66 or the fixing device 67. Preferably, the fixing spike 66 or the fixing device 67 engage the removable die 10 before the ejection spike 62 moves the removable die 10.

According to different preferred embodiments of the present invention, the ejection spike 62 and the fixing spike 66 or the fixing device 67 are each moved by a pneumatic cylinder. Also preferred are hydraulic cylinders, electromotive actuators, or other drive systems by means of which a linear movement of ejection spike 62 and fixing spike 66 or fixing device 67 are realizable in a coordinated manner. According to preferred embodiments of the present invention, the ejection spike 62 is moved by only one pneumatic cylinder, a pneumatic cylinder having several positions or by two pneumatic cylinders connected in a row in succession (tandem cylinder). Only one pneumatic cylinder moves preferably the ejection spike 62 mainly with a constant shifting velocity. At a cylinder having a plurality of positions or at several combined cylinders, different shifting velocities of the cylinders are selectable. Preferably, the ejection spike 62 is moved in the course of this with a higher shifting velocity into the die dome 30 as it is moved out of the die dome 30 with the removable die 10. During inserting of a removable die 10, preferably these shifting velocities are applied in reversed order. According to another preferred embodiment of the present invention, the fixing spike 66 or the fixing device 67 is formed by a hold-down device of the setting device F or by a device having a piston cylinder drive and a holding surface at the die changer 60 or adjacent to the die dome 30. A respective fixing device 67 is shown in FIG. 2b. It consists of a holding surface which is movable with a piston cylinder drive. The holding surface has to be sufficiently large to provide, engaging at the die head, a counterforce to the impact of the ejection spike 62. Further, the holding surface is preferably sufficiently small so that it is freely movable between adjacent holding sections with holding opening 68 of the die changer 60. The holding surface acts in the same way as the tip of the above-discussed fixing spike 66. Therefore, the explanations with respect to the fixing spike 66 also apply to the fixing device 67. The holding surface is moved preferably by a piston cylinder drive (pneumatic or hydraulic) or by another known linear actuator (see above). In FIG. 2b, the holding surface is connected to an actuator which is arranged below the holding surface in insertion direction of the removable die 10. The holding surface protrudes laterally beyond the actuator and covers in this way a removable die 10 being present in the die changer 60 or in the die dome 30. As soon as preferably the holding surface abuts the upper side of the removable die 10, the movement of the removable die 10 by means of the ejection spike 62 begins For inserting a removable die 10 into the die dome 30 of the setting device, the above-described steps for removing the removable die 10 from the die dome 30 are performed in reversed order. During the preferred usage of a die holder 64 having a plurality of holding openings 68, first of all the holding opening 68 containing the desired removable die 10 is positioned above the through-opening 32 of the die dome 30 (E1). For removing or withdrawing the removable die 10, the ejection spike 62 moves into abutment with the die shaft 14 through the through-opening 32 (E2) and preferably the fixing spike 66 moves into abutment with the die head 12 (E3). Preferably, the fixing spike 66 abuts the upper side of the die head 12 before the ejection spike 62 engages at the die shaft 14.

A preferably synchronously occurring movement of fixing spike 66 and ejection spike 62 raises or lifts the die head 12 out of the holding opening 68 (E4) and the die holder 64 is subsequently rotated (E5). In doing so, the die shaft 14 is moved through the radial clearance of the holding opening 68 and the removable die 10 is completely removed from the die holder 64. For facilitating this removing of the removable die 10 from the die holder 64, recesses are provided in the die holder 64 adjacent to the holding openings 68. By means of these recesses, the removable die 10 is freely insertable into the die dome 30 between the fixing spike 66 and the ejection spike 62 (E6). While the ejection spike 62 is lowered through the through-opening 32, the fixing spike 66 holds the removable die 10 on the ejection spike 62 until the removable die 10 is locked in the die dome 30 (E7).

It is also conceivable that the ejection spike 62 performs the removing and inserting of the removable die 10 without fixing spike 66.

With reference to FIGS. 2 to 12, the above summarized preferred method steps according to the flow charts of FIGS. 13 and 14 will be explained in detail by means of the preferred constructive details of the invention.

In FIG. 2, the die holder 64 is shown in a removal position for a removable die 10. For this purpose, the holding opening 68 having the desired or requested removable die 10 is positioned above the through-opening 32 of the die dome 30. The removable die 10 abuts the edge of the holding opening 68 with the die head 12 and is held thereby. According to a preferred embodiment of the removable die 10, the side of the die head 12 facing the shaft comprises a tapered axial section 24 that is formed as radial web. An outer diameter of the axial section 24 is adapted to the inner diameter of the holding opening 68 and the through-opening 32 such that the die shaft 14 is radially supported at least in the through-opening 32, preferably also in the holding opening 68, by means of the axial section 24. Further, the outer diameter of the axial section 24 is preferably larger than the clearance 69 so that the removable die 10 can only be removed from the holding opening 68 after lifting above the tapering 22. In FIG. 2, the radial clearance 69 of the holding opening 68 is arranged above the die dome 30 at the side of the holding opening 68 facing a camera 72.

The die holder 64 has preferably a star-like structure so that in each arm of the star-like structure, a holding opening 68 can be arranged. The die holder 64 is preferably rotated by a drive or motor 70 such that the respective holding opening 68 is arranged above the die dome 30. As soon as the removable die 10 has been lifted by the ejection spike 62 (cf. FIG. 10), the motor 70 rotates the die holder 64 so that the removable die 10 is moved out of the holding opening 68 through the radial clearance 69 without rotation. Subsequently, the removable die 10 is insertable in the die dome 30 and lockable there.

FIG. 3a shows an enlarged lateral sectional view of the die dome 30 in which a removable die 10 is locked. The removable die 10 comprises at the bottom side of the head the tapered axial section 24. The diameter of the tapered axial section 24 is preferably adapted to the diameter of the through-opening 32 of the die dome 30 and to the diameter of the holding opening 68 of the die holder 64. Thus, the tapered axial section 24 realizes preferably a radial guiding and supporting of the removable die 10 in the holding opening 68 and in the through-opening 32. As a result, the removable die 10 cannot be removed from the holding opening 68 as long as it is not lifted by the ejection spike 62.

Preferably a tapering section 22 is attached to or adjoins the tapered axial section 24. The tapering section 22 has a smaller diameter than the tapered axial section 24. According to a preferred embodiment of the present invention, an identification code of the removable die 10 is arranged on the tapering section 22. As the tapering section 22 is limited at both sides by radially larger sections of the die shaft 14, the tapering section 22 does neither contact the die dome 30 nor the die holder 64. As a consequence, the identification code (not shown) is protected against damages.

An exposed radial web 18 is attached to or adjoins the side of the tapering section 22 facing away from the head. The exposed radial web 18 has preferably the same diameter than the tapered axial section 24 to radially guide and support the die shaft 14 in the through-opening 32 of the die dome 30. It is also preferred to form the radial web 18 with a smaller outer diameter than the axial section 24 (see below). Exposed in this context means that the radial web 18 steps back at its axial side surfaces to a smaller diameter than its maximum diameter. As a result, preferably additional abutment surfaces in axial direction of the die shaft 14 are provided.

At the side of the die shaft 14 facing away from the head, a further radial web 16 is arranged spaced in axial direction with respect to the radial web 18. The radial web 16 provides preferably in axial direction an axial undercut on one side or on two sides, respectively. This axial undercut serves for the locking of the removable die 10 in the die dome 30. According to an embodiment of the present invention, the radial web 16 has a smaller radial extension than the radial web 18 to facilitate the locking of the radial web 16 in a snap-in locking structure 44 (see below).

The die shaft 14 ends preferably in the ejection surface 20. This ejection surface 20 may be designed in different ways and it is preferably adapted to an engaging end of the ejection spike 62. According to FIG. 3a, the ejection surface 20 is provided at a cylindrical end of the die shaft 14, wherein preferably a chamfer or beveling 21 supports a cooperation with holding shells 38 (see below). The ejection surface 20 cooperates with a closed guiding end 61 of the ejection spike 62 (not shown).

Based on FIG. 10, it can be seen that also the axial side of the radial web 16 facing away from the head may act as ejection surface 20. This is preferred if the ejection spike 62 is formed hollow at the guiding end 61. In this case, the end of the die shaft 14 facing away from the head is received in the ejection spike 62 to better hold the removable die 20 at the ejection spike 62 and to move it in a more controlled manner According to a further preferred embodiment of the present invention, the through-opening 32 of the die dome 30 comprises a guiding section 34 to guide and stabilize the die shaft 14 by means of the at least one radial web 18 and the tapered axial section 24. The guiding section 34 is adjoined by a locking section 36 having a radial enlargement with respect to the guiding section 34. Within this locking section 36, at least two holding shells 38 are arranged preferably spring-pretensioned such that they leave an inner opening 39 for the ejection spike 62 and the die shaft 14 blank. The radially inwardly directed spring pretension of the holding shells 38 is preferably created by an annular spring 42 or another spring element. For supporting the pivoting function of the holding shells 38, the annular spring 42 is arranged off-center in the part of the holding shells 38 facing the removable die 10.

A radial outer side of the holding shells 38, here preferably two holding shells, is, respectively, spaced from a radially inner side of the through-opening 32 by a radial length of a tilting web 40. The tilting web 40 is also and similar to the annular spring 42 arranged preferably displaced off-center in the direction of the end of the holding shells 38 facing away from the die. The side 41 of the holding shells 38 adjacent to the tilting web 40 axially in the direction of the removable die 10 forms a tilting lever so that the holding shells 38 can be displaced radially outwardly. It is thus also preferred that the holding shells 38 end at their end facing away from the die axially with the tilting lever 40.

For supporting the radial displacing of the sides 41 of the holding shells 38 facing the die, preferably a gap 43 is opened inversely V-shaped between the two holding shells 38 at the end thereof facing away from the die. This gap 43 closes if the sides 41 are pressed radially outwardly by the ejection spike 62 which is moved in the direction of the removable die 10.

The holding shells 38 are held in a form-fit manner or positively within the locking section 36 by means of an insert element 46. The insert element 46 is formed hollow-cylindrically and is fastened in the through-opening 32 of the die dome 30 preferably by means of an outer thread, a press-fit or by another suitable connection.

As can be seen based on FIG. 3a, the inner opening 39 comprises, in the direction of the removable die 10 following a preferred chamfer or beveling or following a continuous transition, a section with a first inner diameter. This first inner diameter is adapted to an outer diameter of the guiding end 61 of the ejection spike 62. During the insertion of the ejection spike 62 into the inner opening 39, especially into the section with the first inner diameter—the holding shells 38 are thus not displaced radially outwardly (see FIG. 7).

In the direction of the removable die 10 and in axial direction spaced from the tilting web 40, the inner opening 39 is tapered to a second inner diameter that is smaller than the outer diameter of the guiding end 61 of the ejection spike 62. As soon as the guiding end 61 of the ejection spike 62 reaches this tapered portion having the snap-in locking structure 44, the sides 41 of the holding shells 38 are pressed radially outwardly. At the same time, the radially inner sides of the inner opening 39 at the end of the holding shells 38 facing away from the die are moved radially inwardly (see FIG. 8) as they are also pivoted around the tilting webs 40. For avoiding here a jamming of the ejection spike 62 in the inner opening 39 at the end of the holding shells 38 facing away from the die, the ejection spike 62 has a smaller diameter in a section 63 following the guiding end 61 than at the guiding end 61. The difference in the diameter of guiding end 61 and section 63 is adapted to the tilting or pivoting of the holding shells 38 by means of which the snap-in locking structure 44 is released from the radial web 16 so that it is prevented that the ejection spike 62 is clamped.

A further preferred construction of the die dome 30 is shown in FIG. 3b. In contrast to the embodiment according to FIG. 3a, only one holding shell 38 is provided here, which is spring-pretensioned preferably against the wall of the opening 36. The holding shell 38 and also the remaining constructive elements of the die dome 30 work in the same way as it has been described with respect to FIG. 3a. The sole holding shell 38 pivots by means of the tilting web 40 if the ejection spike 62 is moved into the through-opening 32 in the direction of the die head 12. After a removable die 10 has been inserted into the die dome 30 and during removing of the ejection spike 62 from the through-opening 32, the snap-in locking structure 44 of the sole holding shell 38 locks at the radial web 16. In doing so, the snap-in locking structure 44 engages at the radial web 16 preferably on one side or on two sides.

Due to the radially outwardly pivoting of the holding shells 38 by means of the tilting web 40, the radial web 16 is released from the locking snap-in locking structure 44. At the same time, preferably the end of the die shaft 14 enters the hollow ejection spike 62 until the radial web 16 is supported at the guiding end 61 of the ejection spike 62. According to a preferred embodiment of the present invention, the locking snap-in locking structure 44 consists of a locking groove so that the radial web 16 is encompassed on both sides with respect to its axial side surfaces. As a consequence, both axial side surfaces of the radial web 16 form an axial undercut in the through-opening 32 of the die dome 30 in insertion and extraction direction of the die shaft 14, respectively. It is also preferred that the snap-in locking structure 44 locks only at one side at the radial web 16 such that an axial removing of the removable die 10 from the through-opening 32 of the die dome 30 is prevented.

If the ejection spike 62 is further moved towards the removable die 10, the removable die 10 is removed from the die dome 30 and brought into alignment in a holding opening of the die holder 64 (cf. FIG. 10). Thereafter, the lowering of the removable die 10 into the holding opening 68 occurs, after the removable die 10 has been arranged in the holding opening 68 by means of the radial clearance 69 (cf. FIG. 9).

Before the removable die 10 is placed in the holding opening 68, the camera 72 detects the identification code (not shown). According to a first preferred embodiment of the present invention, the identification code is arranged on the tapering section 22 of the die shaft 14. The identification code may be a barcode, a two-dimensional code, a numbering or another detectable coding. Therefore, it is also preferred to replace the camera 72 by a scanner or another sensor. Preferably, the identification code is detected and electronically stored prior to the placing of a removable die 10 in the holding opening 68 and prior to the inserting of the removable die 10 in the die dome 30.

According to a further preferred embodiment of the present invention, the radial web 18 is used as identification code. For this purpose, the radial web 18 is variable in its axial length to provide a detectable die information over the length of the radial web 18. Further preferred, the radial web 18 comprises one or a plurality of punctures 19. The punctures 19 are adjustable in their number and axial width to transmit in this way further die information. If the above-described camera 72 or a scanner are used, the radial web 18 with punctures 19 is detectable in a side view. At that, the radial web 18 with punctures 19 looks similar to a barcode for identifying the removable die 10.

In FIGS. 9 to 12, the method for inserting another removable die 10 into the die dome 30 is illustrated. According to a preferred embodiment of this method, first of all the holding opening 68 with the chosen removable die 10 is positioned above the ejection spike 62 (see FIG. 9). In FIG. 9, it can also be seen that the die holder 64 contains several removable dies 10 from which, for example with the support of a personal computer (not shown) or an electronic data processing, the appropriate removable die 10 may be chosen. Accordingly, the holding opening 68 containing the chosen removable die 10 is subsequently rotated to be above the ejection spike 62.

According to FIG. 10, subsequently the ejection spike 62 moves out of the die dome 30, detects the end of the die shaft 14 facing away from the head and lifts the removable die 10 within the holding opening 68. As a result, the tapered axial section 24 is released from the holding opening 68. Preferably, now the tapering section 22 is aligned with the radial clearance 69 of the holding opening 68. It is also preferred that the tapering section 22 is formed smaller in its outer diameter than the width of the radial clearance 69. Therefore, the removable die 10 can be removed from the holding opening 68 by means of the radial clearance 69 of the holding opening 68. For realizing this removing, the die holder 64 is rotated with lifted removable die 10 according to FIG. 10 so far that the removable die 10 is arranged between two adjacent holding openings 68.

Further, the camera 72 detects in the lifted condition of the removable die 10 the identification code thereof, which is preferably arranged on the tapering section 22 or which is stored and detectable by means of the construction of the radial web 18 with punctures 19.

According to a preferred embodiment of the present invention, the fixing spike 66 engages at the upper side of the die head 12 prior to the lifting of the removable die 10 by the ejection spike 62. Thereafter, the removable die 10 is lifted with a coordinated movement of fixing spike 66 and ejection spike 62 from the holding opening 68 to rotate the die holder 64 subsequently (see above).

As results from FIG. 11, the ejection spike 62 is lowered into the through-opening 32 of the die dome 30 after the releasing of the removable die 10 from the holding opening 68. Because the ejection spike 62 keeps the holding shells 38 open or pivots them radially outwardly into an open position (see above), the die shaft 14 moves into the through-opening 32 until abutment of the die head 12 at an upper side of the die dome 30. The reaching of this position is supported preferably by the action of the fixing spike 66 which keeps the removable die 10 constantly in abutment at the ejection spike 62 or which presses the die shaft 14 into the through-opening 32 of the die dome 30.

As soon as the die shaft 14 has reached the lowest position in the through-opening 32, the ejection spike 62 is moved further out of the inner opening 39 of the holding shells 38. As soon as the guiding end 62 of the ejection spike 62 has left the tapered portion of the inner opening 39, the holding shells 38 are set back into the initial position by means of the spring pretension of the annular spring 42. Thereby, the snap-in locking structure 44 locks at the radial web 16 and the gap 43 opens again, as it is shown in FIG. 12.

A further preferred embodiment of a die dome 30' is shown in FIGS. 4 to 6. The die shaft 14' is also held in the through-opening 32' of the die dome 30' and removed by the ejection spike 62. In the same way, preferably the fixing spike 66 engages at the upper side of the die head 12 as has been described above. The die shaft 14' comprises a circumferential radial groove 15' for locking in the die dome 30'. Within the die dome 30', a rotatable bolt 33' is arranged which extends transversely to the through-opening 32' of the die dome 30'. The bolt 33' crosses the through-opening 32' like a chord and in doing so engages the radial groove 15' of the die shaft 14'.

The bolt 33' comprises on one side a sector of a circle 35' at the level of the radial groove 15'. If the bolt 33' is rotated such that the sector of a circle is arranged in the through-opening 32, the removable die 10' is insertable in the through-opening 32' and removable therefrom. If the bolt 33' has been rotated so that the sector of a circle 35' is arranged outside of the through-opening 32', the bolt 33' in the radial groove 15 blocks the die shaft 14' in the through-opening 32'.

For rotating the bolt 33', it preferably comprises an engagement feature, as for example a slot, a hexagon or an appropriate connection with a mechanical or electro-motoric actuator. For locking the bolt 33' in its rotation angle position, preferably a ball pressure part 37', a locking screw or another known locking is provided.

After releasing the locking by rotating the bolt 33', the removable die 10' is in the same way as described above removable from the die dome 30' with the ejection spike 62 and the fixing spike 66, positionable in the die holder 64 and insertable in the die dome 30'.

6. SUMMARY OF THE PREFERRED EMBODIMENTS

1. Removable die (10) of a joining tool (6), in particular of a setting device, comprising a die head (12) having an upper side and a bottom side as well as a die shaft (14) extending perpendicularly from the bottom side of the die head (12) and being adapted to be receivable and lockable in a die dome (30) without rotation, wherein the die shaft (14) comprises:
   a. at least one first radial web (16) forming at least an axial undercut on one side by means of which the die shaft (14) is solely lockable in the die dome (30) by means of a linear inserting movement,
   b. at least one second radial web (24), the radial length of which is adaptable to a diameter of the die dome (30) to ensure a lateral guiding of the die shaft (14) in the die dome (30) and which is arranged between the die head (12) and the first radial web (16), and
   c. an ejection surface (20) by means of which the removable die (10) can be moved out of the die dome (30) and which is arranged adjacent to the free end of the die shaft (14) opposite to the die head (12).

2. Removable die (10) according to embodiment 1, comprising a die coding arranged on or at the die shaft (14) and being optically evaluable.

3. Removable die (10) according to embodiment 2, the die shaft (14) of which has a radial tapering section (22) having a smaller radial extension than the second radial web (24) and on which the die coding is arranged and/or the die shaft (14) of which comprises a third radial web (18) which constitutes the evaluable die coding by means of an axial length and at least one puncture (19).

4. Removable die (10) according to embodiment 1, the die head (12) of which comprises a radially tapered axial section (24) forming the second radial web (24), extending in the direction of the die shaft (14) and being adaptable in its radial extension to the diameter of the die dome (30).

5. Die dome (30) of a joining device, in particular a setting device, in which a die shaft (14) of a die (30), in particular a removable die according to one of the embodiments 1 to 4, is receivable and lockable without rotation, and which comprises the following features:
   a. a hollow cylindrical through-opening (32) for receiving and guiding a die shaft (14) comprising an axial guiding section (34) and an axial locking section (36) adjacent thereto, wherein
   b. in the locking section (36), a form-fit acting and spring-pretensioned locking arrangement (38, 42) is provided and configured such that a die shaft (14) is automatically lockable therein by means of a rotation-free inserting of the die shaft (14) into the locking section (36) in an insertion direction and it is automatically releasable from the locking arrangement (36) and removable from the die dome (30) by means of an inserting of an ejection spike (62) into the through-opening (32) in an ejection direction opposite to the insertion direction.

6. Die dome (30) according to embodiment 5, comprising a plurality of holding shells (38) in the locking section (36) which each comprise a tilting web (40) at a radially outer side so that an inner side of the holding shell (38) is pivotable around the tilting web (40).

7. Die dome (30) according to embodiment 6, the holding shells (38) of which are spring-pretensioned into an initial position axially spaced with respect to the tilting web (40) so that the holding shells (38) can automatically pivot back into the initial position after pivoting.

8. Die dome (30) according to embodiment 6 or 7, the locking section (36) of which comprises in the through-opening (32) a greater diameter as the guiding section

(34) and the holding shells (38) are arranged in a form-fit manner in the locking section (36) by means of an insert element (44).

9. Die dome (30) according to embodiment 6 or 7, the plurality of holding shells (38), preferably two holding shells (38), of which define an at least two-stage through-opening (39) which has a greater diameter adjacent to the tilting web (40) than remote from the tilting web (40) and which comprises a radially inwardly protruding snap-in locking structure (44) remote from the tilting web (40), especially a snap-in locking web or a snap-in locking groove.

10. Die dome (30') of a joining device (F), in particular a die dome (30') of a setting device, in which a die shaft (14') of a die (10') is receivable and lockable without rotation, and which comprises the following features:
    a. a hollow cylindrical through-opening (32') for receiving and guiding a die shaft (14') comprising an axial guiding section (34') and an axial locking section (36') adjacent thereto, wherein
    b. in the locking section (36'), a form-fit acting locking arrangement with a rotatable and/or slidable locking element (33') is provided so that a die shaft (14') is lockable and unlockable therein by means of an inserting of the die shaft (14') into the locking section (36') in an insertion direction without rotation and by rotating and/or sliding or moving the locking element (33') and which is removable from the locking arrangement (36') and from the die dome (30') by means of an inserting of an ejection spike (62') into the through-opening (32') in an ejection direction opposite to the insertion direction.

11. Die dome (30') according to embodiment 10, in which the locking element (33') is formed pin-like having a radial asymmetric tapering (35') and partly extends through the through-opening (32') so that the through-opening (32') is blockable or releasable by the tapering (35') by means of a rotation of the locking element (33') around a longitudinal axis of the locking element (33').

12. Die changer (60) for a removable die (10) of a joining device (F), in particular of a setting device, which is arrangeable in a die dome (30) of the joining device (F) comprising a through-opening (32), wherein the die changer (60) comprises the following features:
    a. a die holder (64) having at least one holding opening (68) which is adapted to the removable die (10) such that a die shaft (14) is receivable in the holding opening (68) and a die head (12) can be supported at an edge of the holding opening (68), wherein the holding opening (68) comprises a radial clearance (69) for radially inserting the die shaft (14) into the holding opening (68), and
    b. an axially movably arranged ejection spike (62) which is adapted to the die dome (30) such that the ejection spike (62) is completely movable through the through-opening (32) of the die dome (30) for ejecting a removable die (10) from the die dome (30).

13. Die changer (60) according to embodiment 12, the die holder (64) of which comprises a rotatably arranged disc having a plurality of holding openings (68), the holding openings (68) of which are specifically movable adjacent to the die dome (30).

14. Die changer (60) according to embodiment 12 or 13, comprising an axially movably arranged fixing spike (66), which is movably coaxially with respect to the ejection spike, or a fixing device (67) which is adapted to engage at an upper side of the removable die (10) and to move matched to the ejection spike (62).

15. System (S) for changing a removable die (10) of a joining device (F), in particular a setting device, comprising a joining device (F) having a die dome (30, 30') according to one of the embodiments 5 to 11 and a die changer (60) according to one of the embodiments 12 to 14, which is preferably adapted to remove a removable die (10, 10') according to one of the embodiments 1 to 4 from the die dome (30, 30') or to insert it therein.

16. Method for removing a removable die (10) from a joining device (F) which is fastened in a die dome (30) having a through opening (32), wherein the method comprises the following steps:
    a. arranging the die dome (30), especially a die dome according to one of the embodiments 5 to 11, above an ejection spike (62) (S1),
    b. moving the ejection spike (62) through the die dome (30), wherein the ejection spike (62) releases the removable die (10) from a locking section (36) of the die dome (30) (S2),
    c. moving the removable die (10) with the ejection spike (62) beyond the die dome (30) in lateral alignment with a holding opening (68) of a die holder (64) of a die changer (60), especially a die changer according to embodiment 12 (S3),
    d. relatively moving the die holder (64) and the removable die (10) with respect to each other so that the removable die (10) is arranged in the holding opening (68) of the die holder (64), and
    e. inserting the removable die (10) in the holding opening (68) by axially moving the ejection spike (62) (S4).

17. Method according to embodiment 16, having the further step:
    moving a fixing spike (66) or a fixing device (67) in abutment with an upper side of a die head (12) of the removable die (10), preferably before the ejection spike (62) moves the removable die (10), and
    holding the removable die (10) between ejection spike (62) and fixing spike (66) or fixing device (67) while moving the removable die (10) towards the holding opening (68) of the die holder (64).

18. Method according to embodiment 16, comprising the further step:
    moving the ejection spike (62) into a through opening (39) formed of at least one holding shell (38) in the locking section (36) of the die dome (30) and
    unlocking the removable die (10) by means of a pivoting of the holding shells (38) by means of the ejection spike (62).

19. Method for inserting a removable die (10) of a joining device (F), in particular a setting device, comprising a die dome (30) having a through-opening (32), wherein the method comprises the following steps:
    a. arranging a holding opening (68) of a die holder (64), especially a die holder of a die changer according to one of the embodiments 12 to 14, containing a removable die (10) above an ejection spike (62) which has been moved through the through-opening (32) of the die dome (30) (E1),
    b. releasing the removable die (10) from the holding opening (68) by means of a moving of the ejection spike (62) (E2),
    c. removing the holding opening (68) from the released removable die (10) (E3), and d. moving the ejection spike (62) through the through-opening (32) of the die dome (30), wherein the removable die (10) locks in a locking section (36) of the die dome (30) (E4).

20. Method according to embodiment 19, wherein the removable die (10) is pushed by means of a fixing spike (66) or a fixing device (67) into the locking section (36) having a plurality of holding shells (38).

7. LIST OF REFERENCE SIGNS

F joining device
S system
10 removable die
12 die head
14 die shaft
15' radial groove
16 first radial web
18 second radial web
19 puncture
20 ejection surface
21 beveling
22 tapering section
24 tapered axial section
30, 30' die dome
32, 32' through-opening
33' rotatable bolt
34 guiding section
36 locking section
38 holding shells
39 inner opening
40 tilting web
42 spring/annular spring
43 gap
44 snap-in locking structure
46 insert element
60 die changer
61 guiding end of the ejection spike
62 ejection spike
63 section with smaller diameter
64 die holder
66 fixing spike
67 fixing device
68 holding opening
69 radial clearance
70 motor
72 camera

The invention claimed is:

1. Method for removing from a joining device a removable die which is fastened in a die dome having a through opening, wherein the method comprises the following steps:
   a. arranging the die dome above an ejection spike,
   b. moving the ejection spike in a direction of a longitudinal axis of the ejection spike and through the die dome, wherein the ejection spike releases the removable die from a locking section of the die dome,
   c. moving the removable die via the ejection spike beyond the die dome to a position wherein a dimension of the removable die in the direction of the longitudinal axis of the ejection spike is laterally offset from and in lateral alignment with a holding opening of a die holder of a die changer,
   d. relatively moving the die holder and the removable die with respect to each other so that the removable die is arranged in the holding opening of the die holder, and
   e. inserting the removable die in the holding opening by axially moving the ejection spike.

2. Method according to claim 1, having the further step:
moving a fixing spike or a fixing device in abutment with an upper side of a die head of the removable die, and
holding the removable die between the ejection spike and the fixing spike or the fixing device during the relatively moving of the die holder and the removable die with respect to each other.

3. Method according to claim 1, comprising the further step:
moving the ejection spike into a through opening formed by at least one holding shell located in the locking section of the die dome and
unlocking the removable die by means of a pivoting of the at least one holding shell by means of the ejection spike.

4. Method according to claim 1, wherein the through-opening of the die dome is
a hollow cylindrical through-opening for receiving and guiding a die shaft of the removable die, the through-opening comprising an axial guiding section and an axial locking section adjacent thereto, wherein
   a1. in the locking section, a spring-pretensioned locking arrangement is provided and configured such that the die shaft is automatically lockable in the locking section by means of inserting, without rotating the die shaft, the die shaft into the locking section in an insertion direction, and the die shaft is automatically releasable from the locking arrangement and removable from the die dome by means of an inserting of the ejection spike into the through-opening in an ejection direction opposite to the insertion direction, or wherein
   a2. in the locking section, a locking arrangement system with a rotatable and/or slidable locking element is provided so that the die shaft is lockable and unlockable in the locking section by means of inserting, without rotating the die shaft, the die shaft into the locking section in the insertion direction and by rotating and/or sliding or moving the locking element, and wherein the die shaft is removable from the locking arrangement system and from the die dome by means of an inserting of the ejection spike into the through-opening in an ejection direction opposite to the insertion direction.

5. Method according to claim 1, wherein the
holding opening is adapted to the removable die such that a die shaft of the removable die is receivable in the holding opening and a die head of the removable die can be supported at an edge of the holding opening, wherein the holding opening comprises a radial clearance for radially inserting the die shaft into the holding opening.

6. Method according to claim 1, having the further step:
moving a fixing spike or a fixing device in abutment with an upper side of a die head of the removable die, before the moving of the removable die beyond the die dome via the ejection spike, and
holding the removable die between the ejection spike and the fixing spike or the fixing device during the moving of the removable die beyond the die dome.

7. Method for inserting a removable die into a through-opening of a die dome of a joining device, wherein the method comprises the following steps:
   a. moving an ejection spike in a direction of a longitudinal axis of the ejection spike and through the through-opening of the die dome;

b. arranging a holding opening of a die holder containing a removable die above the ejection spike which has been moved through the through-opening of the die dome,
c. releasing the removable die from the holding opening by means of a moving of the ejection spike such that the released removable die remains located within the holding opening,
d. removing the holding opening from the released removable die via laterally moving the holding opening relative to the released removable die, and
e. moving the ejection spike through the through-opening of the die dome, wherein the removable die locks in a locking section of the die dome.

8. Method according to claim 7, wherein the locking section has a plurality of holding shells, and wherein the removable die is pushed by means of a fixing spike or a fixing device into the locking section.

9. Method according to claim 7, wherein the die holder is a die holder of a die changer, and wherein
the holding opening is adapted to the removable die such that a die shaft of the removable die is receivable in the holding opening and a die head of the removable die can be supported at an edge of the holding opening, wherein the holding opening comprises a radial clearance for radially inserting the die shaft into the holding opening, and wherein
the ejection spike is completely movable through the through-opening of the die dome for ejecting the removable die from the die dome.

10. Method according to claim 7, wherein the through-opening of the die dome is a hollow cylindrical through-opening for receiving and guiding a die shaft of the removable die, the through-opening comprising an axial guiding section and an axial locking section adjacent thereto, wherein a1. in the locking section, a spring-pretensioned locking arrangement is provided and configured such that the die shaft is automatically lockable in the locking section by means of inserting, without rotating the die shaft, the die shaft into the locking section in an insertion direction, and the die shaft is automatically releasable from the locking arrangement and removable from the die dome by means of an inserting of the ejection spike into the through-opening in an ejection direction opposite to the insertion direction, or wherein a2. in the locking section, a locking arrangement system with a rotatable and/or slidable locking element is provided so that the die shaft is lockable and unlockable in the locking section by means of inserting, without rotating the die shaft, the die shaft into the locking section in the insertion direction and by rotating and/or sliding or moving the locking element, and wherein the die shaft is removable from the locking arrangement system and from the die dome by means of an inserting of the ejection spike into the through-opening in an ejection direction opposite to the insertion direction.

11. Method according to claim 7, wherein the joining device is a setting device.

* * * * *